(12) United States Patent
Tsuruno et al.

(10) Patent No.: US 9,127,999 B2
(45) Date of Patent: Sep. 8, 2015

(54) ULTRASONIC SENSOR, TACTILE SENSOR, GRASPING APPARATUS, AND ELECTRONIC DEVICE

(75) Inventors: Jiro Tsuruno, Nagano (JP); Tsutomu Nishiwaki, Nagano (JP); Tomoaki Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 403 days.

(21) Appl. No.: 13/332,794

(22) Filed: Dec. 21, 2011

(65) Prior Publication Data

US 2012/0174672 A1 Jul. 12, 2012

(30) Foreign Application Priority Data

Jan. 6, 2011 (JP) .................................. 2011-000977

(51) Int. Cl.
G01N 29/00 (2006.01)
G01L 1/25 (2006.01)
B25J 13/08 (2006.01)
B25J 19/02 (2006.01)
G01L 5/22 (2006.01)

(52) U.S. Cl.
CPC ................. *G01L 1/25* (2013.01); *B25J 13/083* (2013.01); *B25J 19/026* (2013.01); *G01L 5/228* (2013.01)
USPC ............................................. 73/627; 73/597

(58) Field of Classification Search
CPC ....... B25J 13/083; B25J 19/026; G01L 5/228; G01L 1/25
USPC ........ 73/627, 597, 628, 652, 862.43, 862.046
See application file for complete search history.

(56) References Cited

U.S. PATENT DOCUMENTS

| | | | | |
|---|---|---|---|---|
| 4,555,953 A * | 12/1985 | Dario et al. | ............... | 73/862.046 |
| 5,553,500 A | 9/1996 | Grahn et al. | | |
| 7,421,900 B2 * | 9/2008 | Karasawa et al. | ............... | 73/621 |
| 7,426,872 B2 * | 9/2008 | Dittmar et al. | .................. | 73/818 |
| 7,804,742 B2 * | 9/2010 | Ray et al. | ....................... | 367/140 |
| 8,359,931 B2 * | 1/2013 | Nishiwaki | ........................ | 73/846 |
| 8,640,551 B2 * | 2/2014 | Nishiwaki | ........................ | 73/846 |
| 2010/0148627 A1 | 6/2010 | Funasaka et al. | | |
| 2010/0202253 A1 | 8/2010 | Nakamura | | |
| 2011/0121591 A1 | 5/2011 | Nishiwaki | | |
| 2014/0066778 A1 * | 3/2014 | Nishiwaki | ..................... | 600/459 |

FOREIGN PATENT DOCUMENTS

| | | | |
|---|---|---|---|
| JP | 61-207938 A | 9/1986 |
| JP | 2000-254884 A | 9/2000 |
| JP | 2006-208248 A | 8/2006 |
| JP | 2007-147443 A | 6/2007 |

(Continued)

*Primary Examiner* — J M Saint Surin
(74) *Attorney, Agent, or Firm* — Global IP Counselors, LLP

(57) ABSTRACT

An ultrasonic sensor includes: a substrate; an ultrasonic transducer disposed on the substrate, and configured and arranged to transmit ultrasonic waves that propagate as plane waves in a direction orthogonal to a surface of the substrate; an acoustic refracting part contacting the ultrasonic transducer, and configured and arranged to refract the ultrasonic waves transmitted from the ultrasonic transducer; an elastically deformable elastic portion contacting the acoustic refracting part; and an ultrasonic reflecting member disposed within the elastic portion, and configured and arranged to reflect the ultrasonic waves. The acoustic refracting part is configured and arranged to refract, toward the ultrasonic reflecting member, the ultrasonic waves transmitted from the ultrasonic transducer.

23 Claims, 20 Drawing Sheets

(56) References Cited

FOREIGN PATENT DOCUMENTS

| | | |
|---|---|---|
| JP | 2009-053040 A | 3/2009 |
| JP | 2010-164331 A | 7/2010 |
| JP | 2010-165028 A | 7/2010 |
| JP | 2010-165341 A | 7/2010 |
| JP | 2010-183437 A | 8/2010 |
| JP | 2010-210283 A | 9/2010 |
| JP | 2010-218365 A | 9/2010 |
| JP | 2010-244119 A | 10/2010 |
| JP | 2011-104472 A | 6/2011 |
| JP | 2011-112459 A | 6/2011 |

* cited by examiner

ULTRASONIC SENSOR, TACTILE SENSOR, GRASPING APPARATUS, AND ELECTRONIC DEVICE

CROSS-REFERENCE TO RELATED APPLICATIONS

This application claims priority to Japanese Patent Application No. 2011-000977 filed on Jan. 6, 2011. The entire disclosure of Japanese Patent Application No. 2011-000977 is hereby incorporated herein by reference.

BACKGROUND

1. Technical Field

The present invention relates to an ultrasonic sensor for transmitting ultrasonic waves, a tactile sensor for detecting contact with a contact object through the ultrasonic waves transmitted from the ultrasonic sensor, and a grasping apparatus comprising the tactile sensor.

2. Related Art

In conventional practice, there are known sensors for detecting the stress applied by contact with an object when an object of unknown weight and friction coefficient is grasped by a robot arm or the like (see Japanese Laid-Open Patent Publication No. 2006-208248, for example).

The tactile sensor disclosed in Japanese Laid-Open Patent Publication No. 2006-208248 has a structural body with a cantilever structure which extends from the edge of an opening formed in a sensor substrate, and this structural body is configured from a flat plate-shaped sensitive part, and a hinge part which joins the sensitive part and the sensor substrate together. An electroconductive magnetic film is formed on the sensitive part of this structural body, a piezoresistive film is formed on the hinge part, and there is an electrical connection between the electroconductive magnetic film and the piezoresistive film. In this configuration, an electrode is provided to the hinge part and the hinge part folds under pressure, whereby an electrical current generated by the piezoresistance of the hinge part flows from the electrode. In this tactile sensor, a plurality of structural bodies such as the one described above are formed on the sensor substrate, and some of these structural bodies stand upright on the sensor substrate while others are held parallel to the sensor substrate. An elastic boy is provided on the sensor substrate, and the upright structural bodies are embedded in the elastic body. Shearing force can be measured by the upright structural bodies, and positive pressure force can be measured by the structural bodies that are parallel to the substrate surface. In this tactile sensor, shearing force is detected by the structural bodies that stand upright relative to the sensor substrate, and positive pressure force is detected by the structural bodies that are held parallel to the sensor substrate. The upright structural bodies are formed by bending flat plate-shaped structural bodies by magnetism.

SUMMARY

In a tactile sensor such as the one disclosed in Japanese Laid-Open Patent Publication No. 2006-208248 described above, the structural bodies that stand upright relative to the sensor substrate and the structural bodies held parallel to the sensor substrate are separated, shearing force is detected by the upright structural bodies, and positive pressure force is detected by the structural bodies parallel to the substrate. Such structural bodies for shearing force detection must be made by bending structural bodies for positive pressure force detection by magnetism and have a complex spatial structure, which poses the problems of poor productivity and increased production costs.

The present invention was devised in view of such problems, and an object thereof is to provide an ultrasonic sensor, a tactile sensor, and a grasping apparatus whereby contact with a contact object can be detected with a simple configuration.

An ultrasonic sensor according to one aspect of the present invention includes a substrate, an ultrasonic transducer, an acoustic refracting part, an elastically deformable elastic portion, and an ultrasonic reflecting member. The ultrasonic transducer is disposed on the substrate, and configured and arranged to transmit ultrasonic waves that propagate as plane waves in a direction orthogonal to a surface of the substrate. The acoustic refracting part contacts the ultrasonic transducer, and is configured and arranged to refract the ultrasonic waves transmitted from the ultrasonic transducer. The elastically deformable elastic portion contacts the acoustic refracting part. The ultrasonic reflecting member is disposed within the elastic portion, and configured and arranged to reflect the ultrasonic waves. The acoustic refracting part is configured and arranged to refract, toward the ultrasonic reflecting member, the ultrasonic waves transmitted from the ultrasonic transducer.

In this ultrasonic transducer of the present invention, the ultrasonic waves propagating as plane waves may for example be transmitted by an ultrasonic element formed into a rectangular shape in a plan view orthogonal to the surface of the substrate. A plurality of ultrasonic elements may be disposed in an array to form an ultrasonic array, and ultrasonic waves propagated as plane waves may be transmitted by a composite wave of the ultrasonic waves transmitted from the ultrasonic element.

According to one embodiment of the present invention, the acoustic refracting part is provided on top of the ultrasonic transducer. Therefore, when ultrasonic waves are transmitted from the ultrasonic transducer, the traveling direction of the ultrasonic waves is changed by the acoustic refracting part to a direction heading towards the ultrasonic reflecting member. The ultrasonic waves are thereby reflected by the ultrasonic reflecting member. The reflected ultrasonic waves are again incident on the acoustic refracting part, whereby their traveling direction is changed to a direction heading towards the ultrasonic transducer. Reflected ultrasonic waves are thereby received by the ultrasonic transducer.

With such a structure, it is possible to detect the distance from the ultrasonic transducer to the ultrasonic reflecting member by measuring the time (TOF data) from the ultrasonic wave transmission timing with which ultrasonic waves are transmitted from the ultrasonic transducer until the ultrasonic wave reception timing with which ultrasonic waves are received by the ultrasonic transducer.

When a contact object comes in contact with the elastic portion and the elastic portion elastically deforms, the ultrasonic reflecting member is moved to a position according to the deformation of the elastic portion. Since the direction in which the ultrasonic waves are refracted by the acoustic refracting part is a constant direction, if the movement distance of the ultrasonic waves can be calculated based on the TOF data, the position coordinates of the ultrasonic reflecting member after moving can be found, and it is possible to calculate the movement amount and movement direction of the ultrasonic reflecting member, i.e., the amount of strain and direction of strain in the elastic portion. From the amount of strain and direction of strain in the elastic portion, it is possible to calculate the shearing force and positive pressure force acting on the elastic portion.

With such a configuration, since the ultrasonic sensor is configured with a stacked configuration in which the acoustic refracting part and elastic portion are formed on the substrate on which the ultrasonic transducer is disposed and the ultrasonic reflecting member is embedded in the elastic portion, the configuration can be simplified, productivity can be improved, and production costs can be reduced in comparison with a configuration in which a structural body is folded by magnetism to form three-dimensional structural body on the substrate as in conventional practice, for example.

In the ultrasonic sensor according to another aspect of the present invention, the ultrasonic reflecting member is preferably spherical.

According to this aspect, since the ultrasonic reflecting member is spherical, if the ultrasonic reflecting member is located in the beam diameter of the ultrasonic waves in beam form, the ultrasonic waves can inevitably be reflected to the source ultrasonic transducer at any point on the spherical surface, and reflected ultrasonic waves can be received reliably by the ultrasonic transducer. Even in cases such as when the ultrasonic reflecting member has rotated due to strain in the elastic portion, this rotation has no effect and the ultrasonic waves can be reflected satisfactorily.

A spherically surfaced ultrasonic reflecting member is also easier to form than a polyhedron having a plurality of reflective surfaces, and manufacturing costs can be reduced.

According to the ultrasonic sensor according to another aspect of the present invention, the ultrasonic reflecting member may be a polyhedron having a plurality of reflective surfaces.

According to this aspect, the ultrasonic reflecting member may be a polyhedron having a plurality of reflective surfaces. In this case, any of the reflective surfaces may be disposed so as to be orthogonal to the traveling direction of the ultrasonic waves. With such a configuration, the ultrasonic waves can be reflected by the entire reflective surface orthogonal to the traveling direction of the ultrasonic waves; therefore, the reflected ultrasonic waves can be strengthened and signal detection precision can be improved.

According to the ultrasonic sensor according to another aspect of the present invention, preferably, the acoustic refracting part has an inclined flat surface that is inclined in relation to the surface of the substrate, along the path traveled by the ultrasonic waves transmitted from the ultrasonic transducer; and the inclined flat surface is formed at an inclination angle which satisfies Equation (1) below, wherein $\theta_1$ is the angle formed by the normal to the inclined flat surface and the direction in which the ultrasonic waves are transmitted from the ultrasonic transducer, $\theta_2$ is the angle formed by the normal to the inclined flat surface and the direction leading from the inclined flat surface to the ultrasonic reflecting member, $C_1$ is the acoustic velocity within the acoustic refracting part, and $C_2$ is the acoustic velocity within the elastic portion.

Equation (1)

$$\frac{\sin\theta_1}{C_1} = \frac{\sin\theta_2}{C_2} \quad (1)$$

According to this aspect, the acoustic refracting part has an inclined flat surface along the traveling path of ultrasonic waves, and the traveling direction of the ultrasonic waves is refracted by this inclined flat surface.

When ultrasonic waves propagate from the acoustic refracting part to the elastic portion, the ultrasonic wave refraction angle is established according to Snell's law and is established by the acoustic velocity in the acoustic refracting part, the acoustic velocity in the elastic portion, and the incidence angle of ultrasonic waves incident on the inclined flat surface from the acoustic refracting part, satisfying the relationship in Equation (1) above. Therefore, by providing an acoustic refracting part having an inclined flat surface which satisfies Equation (1), ultrasonic waves transmitted from the ultrasonic transducer can be led with precision to the ultrasonic reflecting member, and ultrasonic waves reflected by the ultrasonic reflecting member can be led with precision to the ultrasonic transducer.

In the ultrasonic sensor according to another aspect of the present invention, preferably, the acoustic refracting part has a concave surface along the path traveled by the ultrasonic waves transmitted from the ultrasonic transducer, and the concave surface is formed at a curvature whereby the ultrasonic waves are made to converge toward the ultrasonic reflecting member.

According to this aspect, since the acoustic refracting part has a concave surface, the ultrasonic waves are refracted from the concave surface so as to converge at a single point. The curvature of the concave surface is preferably set to an optimal value according to the distance between the ultrasonic reflecting member and the concave surface, for example. The convergent point of ultrasonic waves may be the center point of the ultrasonic reflecting member, for example, or a single point on the surface of the ultrasonic reflecting member during the initial state in which there is no strain in the elastic portion. Thus, when ultrasonic waves are made to converge toward the ultrasonic reflecting member, there is a greater quantity of ultrasonic waves that are reflected toward the ultrasonic transducer, and the position of the ultrasonic reflecting member can be detected with greater detection precision.

In the ultrasonic sensor according to another aspect of the present invention, the acoustic refracting part preferably has a convex surface along the path traveled by the ultrasonic waves transmitted from the ultrasonic transducer.

According to this aspect, since the acoustic refracting part has a convex surface, ultrasonic waves are refracted from the convex surface so as to diffuse. With such a configuration, even when there is a large amount of strain in the elastic portion and the ultrasonic reflecting member moves by a large amount, the position of the ultrasonic reflecting member can be detected from the diffused ultrasonic waves.

In the ultrasonic sensor according to another aspect of the present invention, a plurality of sensor bodies are disposed in an array on the substrate, each of which body being configured from the elastic portion, the ultrasonic reflecting member, the ultrasonic transducer, and the acoustic refracting part.

According to this aspect, a single sensor body can be used to measure the amount of strain and stress in the elastic portion when a contact object has come in contact with the elastic portion in this sensor body, and disposing such sensor bodies in an array makes it possible to detect the stress with any sensor body even when a contact object comes in contact with any position on the contact surface having a certain surface area, for example. Therefore, when an object is grasped by a robot or the like, for example, detection of the grasped position of the object and detection of the grasping force can be appropriately controlled.

In the ultrasonic sensor according to another aspect of the present invention, it is preferable that there be provided, between adjacent sensor bodies on the substrate, a proximity-detecting ultrasonic element for transmitting ultrasonic waves through air and receiving ultrasonic waves reflected by the contact object.

According to this aspect, the ultrasonic sensor is provided with proximity-detecting ultrasonic elements, and the distance to a contact object in proximity to the ultrasonic sensor can be detected. With such a configuration, it is possible to control the output of ultrasonic waves from the ultrasonic elements in a state in which the distance between the ultrasonic sensor and the contact object as detected by the proximity-detecting ultrasonic elements has reached a prescribed value that has been set in advance, for example, and energy can be conserved.

The tactile sensor according to another aspect of the present invention includes the ultrasonic sensor described above, and a control unit configured to control the transmission and reception of ultrasonic waves of the ultrasonic elements of the ultrasonic sensor.

According to this aspect, the tactile sensor comprises the ultrasonic sensor described above. Therefore, the transmission and reception of the ultrasonic waves of the ultrasonic sensor is controlled by the control unit, whereby the shearing force and stress in the form of pressing force when the contact object comes in contact with the elastic portion can be detected with a simple configuration as described above.

In the tactile sensor according to another aspect of the present invention, the control unit preferably has an ultrasonic wave transmission control part configured to control ultrasonic waves to be transmitted from the ultrasonic transducer, a time measurement part configured to measure the time from a timing at which ultrasonic waves are transmitted from the ultrasonic transducer until a reception timing at which ultrasonic waves reflected by the ultrasonic reflecting member are received by the ultrasonic transducer, and a movement amount calculating part configured to calculate an amount and a direction of movement made by the ultrasonic reflecting member, based on the time measured by the time measurement part.

According to this aspect, the ultrasonic wave transmission timing of the ultrasonic elements is controlled by the ultrasonic wave transmission control part, the time from the ultrasonic wave transmission timing to the ultrasonic wave reception timing is measured by the time measurement part, and the movement amount of the ultrasonic reflecting member is calculated based on the measured time by the movement amount calculating part.

Therefore, by measuring the time from the ultrasonic wave transmission timing to the ultrasonic wave reception timing in the ultrasonic transducers, the position coordinates of the ultrasonic reflecting member can be calculated, and the movement amount and movement direction of the ultrasonic reflecting member can be easily calculated.

In the tactile sensor according to another aspect of the present invention, the control unit preferably has a stress calculating part configured to calculate stress acting on the elastic portion based on the amount and the direction of the ultrasonic reflecting member's movement as calculated by the movement amount calculating part and the Young's modulus of the elastic portion.

According to the invention, the stress calculating part calculates the stress acting on the elastic portion by multiplying the Young's modulus of the elastic portion with the movement amount of the ultrasonic reflecting member calculated by the movement amount calculating part. In other words, the positive pressure force can be calculated based on the movement amount of the ultrasonic reflecting member in the Z-axis direction as calculated by the movement amount calculating part and the Young's modulus of the elastic portion, and the shearing force can be calculated based on the movement amount of the ultrasonic reflecting member in the XY plane direction and the Young's modulus of the elastic portion.

In the tactile sensor according to another aspect of the present invention, preferably, the ultrasonic sensor has a plurality of sensor bodies disposed in an array on the substrate, each of the sensor bodies including the elastic portion, the ultrasonic reflecting member, the ultrasonic transducer, and the acoustic refracting part. The tactile sensor preferably has a storage part configured to store correlation data in which a state of a contact object in contact with the elastic portion relative to the stress acting on the elastic portion is recorded, and a contact object identifying part configured to identify the state of the contact object based on the correlation data and the stress calculated by the stress calculating part.

The correlation data, which is stored in the storage part and which records the state of the contact object in contact with the elastic portion in relation to the stress acting on the elastic portion, may be data in which the roughness of the contact surface of the contact object is recorded in relation to the stress acting on the elastic portion, or data in which the type of material of the contact object is recorded in relation to the stress acting on the elastic portion, for example. When the contact object is an elastic body, for example, the softness of the elastic body may be recorded in relation to the stress acting on the elastic portion.

According to this aspect, the contact object identifying part reads correlation data such as is described above from the storage part, and from this correlation data identifies the state of the contact object relative to the stress calculated by the stress calculating part.

With such a configuration, when roughness data of the contact surface of the contact object in relation to stress is recorded as the correlation data, for example, the roughness of the contact object in contact with the elastic portion can be found, and the material of the contact surface of the contact object can also be found from the roughness. When the material of the contact surface of the contact object in relation to stress is recorded as the correlation data, the material in the contact surface of the contact object can be detected directly from the calculated stress. Furthermore, when the softness of the contact object in relation to stress is recorded as the correlation data, for example, the kneaded state of bread dough and other characteristics, for example, can be distinguished by the tactile sensor and whether or not the optimal kneaded state has been achieved can be determined.

A grasping apparatus according to another aspect of the present invention includes a pair of grasping arms, the tactile sensor, a grasping detection part and a drive control part. The grasping arms are configured and arranged to grasp the object and each having a contact surface that comes in contact with the object. The tactile sensor is disposed in each of the contact surfaces of the grasping arms. The grasping detection part is configured to detect a state of slippage of the object based on a signal outputted from the tactile sensor. The drive control part is configured and arranged to control driving of the grasping arms based on the slippage state.

According to this aspect, the shearing force when the grasped object is grasped is measured by the tactile sensor as described above, whereby it is possible to measure whether the object is in a state of slipping out of the grasping arms or in a state of being grasped. Specifically, during the action of grasping the object, when the object cannot be grasped sufficiently, a shearing force corresponding to the kinetic friction force takes effect, and the more the grasping force is increased, the greater this shearing force. When the grasping force is increased and a shearing force corresponding to a static friction force is detected, the grasping of the object is complete, the static friction force remains constant even if the grasping force is increased, and the shearing force therefore does not change. Therefore, by gradually increasing the grasping force on the object and detecting the point in time when the shearing force ceases to change, for example, the object can be grasped with the bare minimum grasping force without damaging the object.

The tactile sensor constituting the grasping apparatus has a simple configuration merely including the ultrasonic transducer, the acoustic refracting part, and the elastic portion containing the embedded ultrasonic reflecting member stacked on the substrate as described above, and the tactile sensor can be easily manufactured; therefore, a simple configuration can be similarly achieved also in a grasping apparatus that uses such a tactile sensor, and the grasping apparatus is easily manufactured as well.

BRIEF DESCRIPTION OF THE DRAWINGS

Referring now to the attached drawings which form a part of this original disclosure.

DETAILED DESCRIPTION OF EXEMPLARY EMBODIMENTS

First Embodiment

A tactile sensor of a first embodiment according to the present invention is described hereinbelow based on the drawings.

1. Configuration of Tactile Sensor

Figure 1:
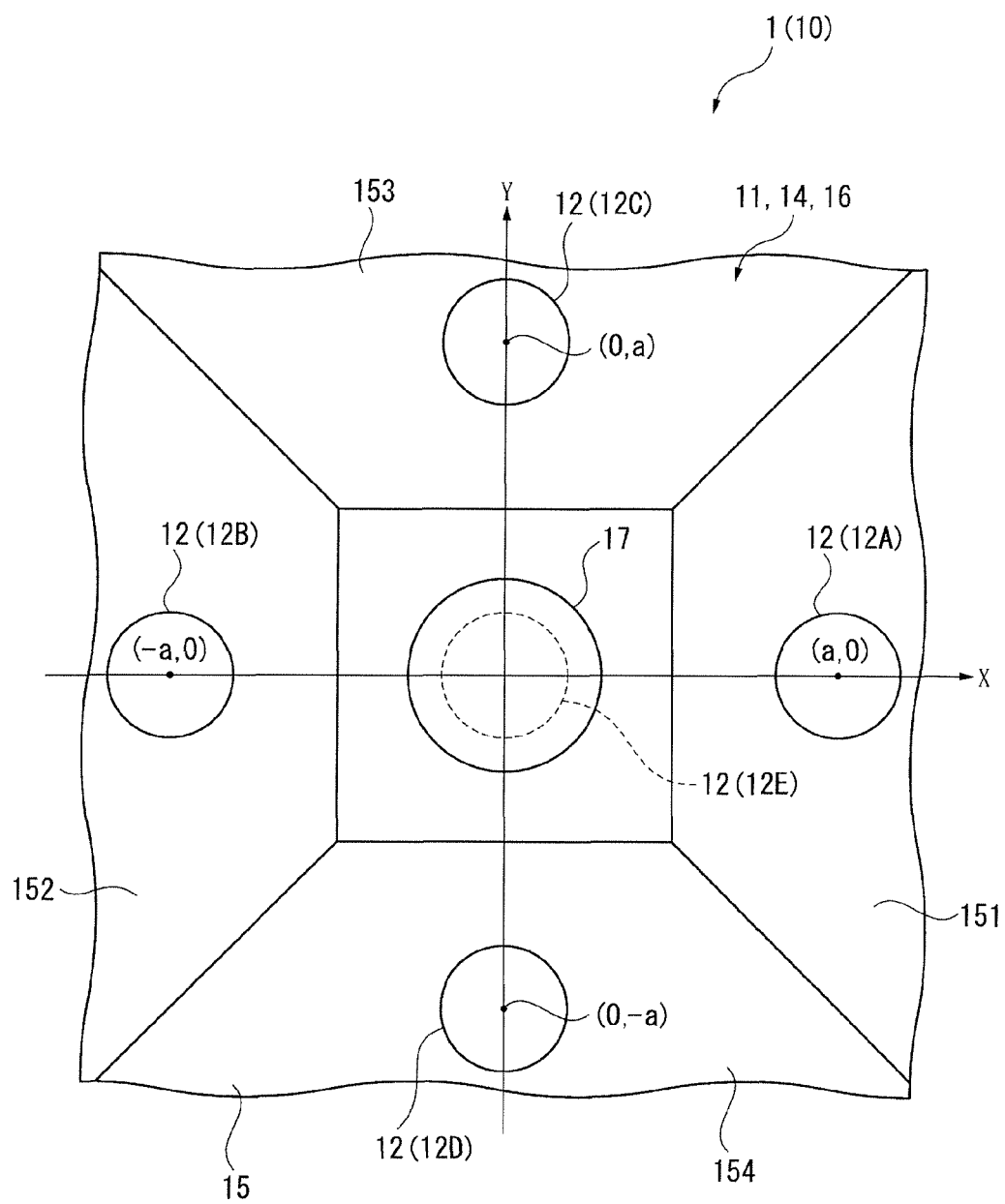
FIG. 1 is a plan view showing the schematic configuration of a sensor body of a tactile sensor of a first embodiment according to the present invention.
Figure 2:
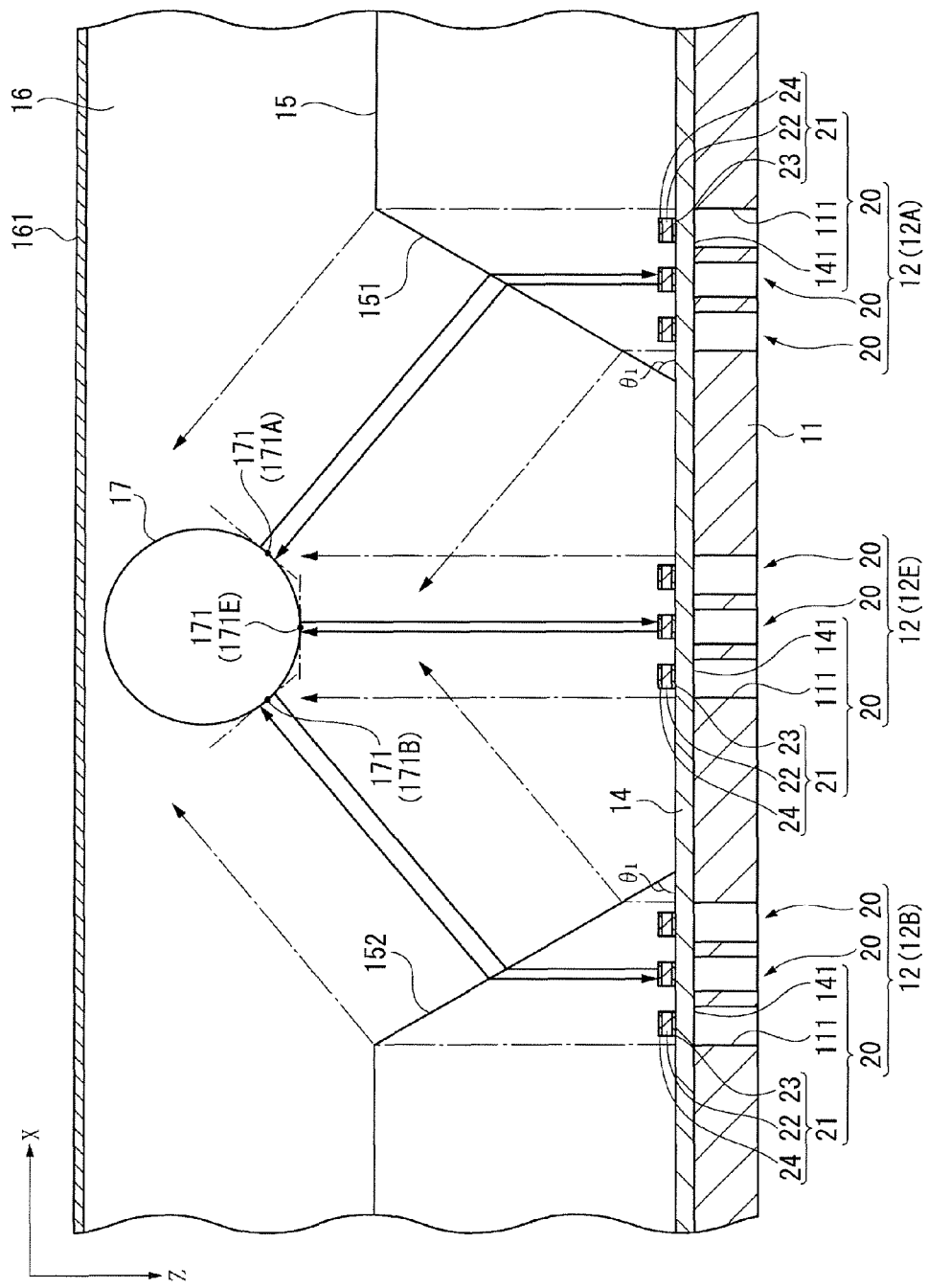
FIG. 2 is a schematic cross-sectional view of a cross section of the XZ plane in the sensor body of the first embodiment.
Figure 3:
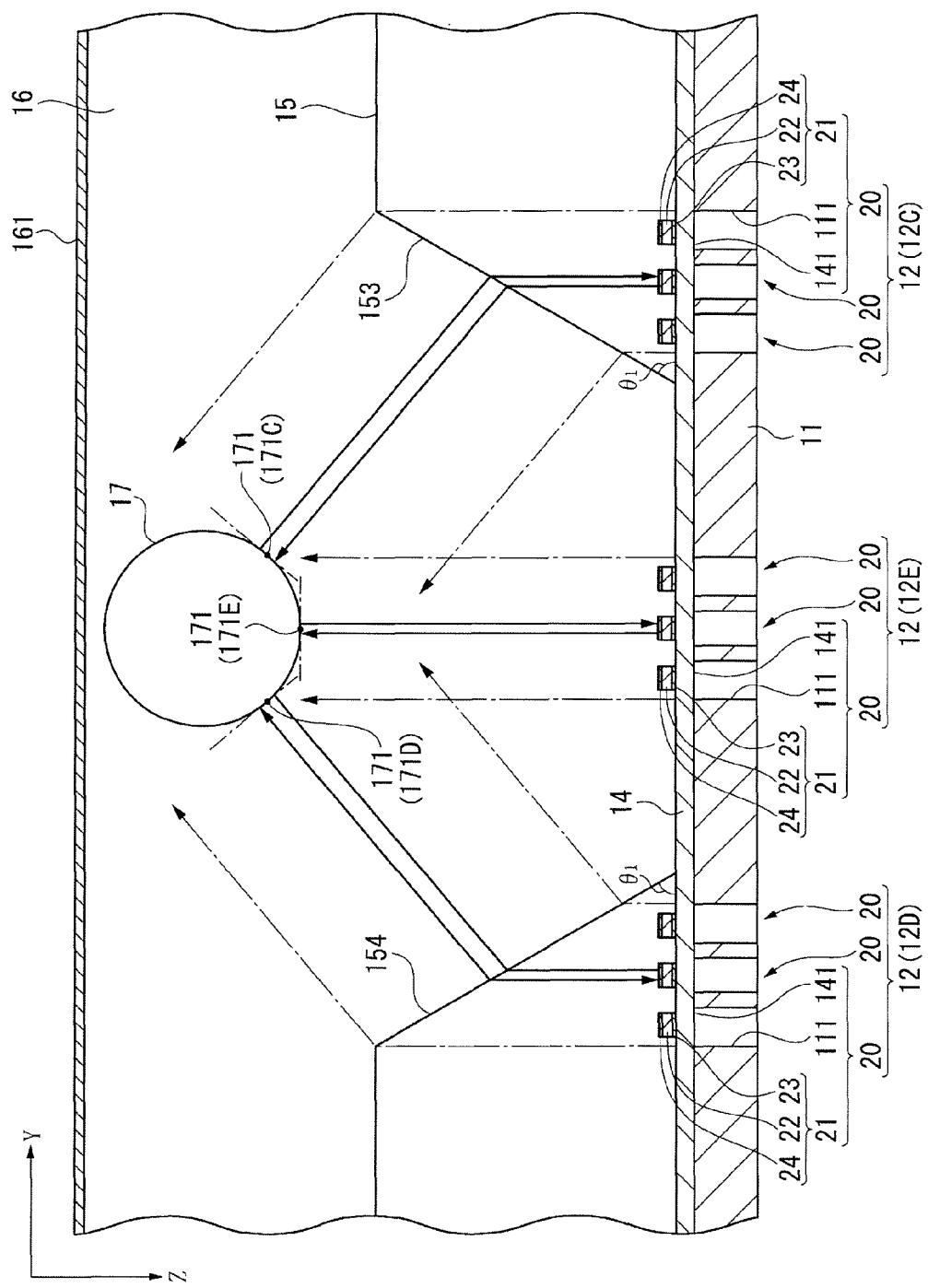
FIG. 3 is a schematic cross-sectional view of a cross section of the YZ plane in the sensor body of the first embodiment.

FIG. 1 is a plan view showing the schematic configuration of a sensor body 10 (an ultrasonic sensor) of a tactile sensor 1 of the first embodiment, FIG. 2 is a cross-sectional view showing the schematic configuration of the XZ plane cross section of the sensor body 10, and FIG. 3 is a cross-sectional view showing the schematic configuration of the YZ plane cross section of the sensor body 10.

The tactile sensor 1 is configured comprising the sensor body 10 and a control unit or controller 30 (see FIG. 6) described hereinafter. The sensor body 10, as shown in FIG. 1, is configured by stacking a support film 14, an ultrasonic array 12 (constituting the ultrasonic transducer of the present invention), an acoustic lens 15 (constituting the acoustic refracting part of the present invention), and an elastic portion 16 on a substrate 11, and an ultrasonic reflecting member 17 is embedded within the elastic portion 16. This tactile sensor 1 is a sensor for detecting the positive pressure force and shearing force exerted when a contact object comes in contact with the elastic portion 16.

The first embodiment shows an example in which a single sensor body 10 is provided as an ultrasonic sensor, but the ultrasonic sensor is not limited to one, and a plurality of these sensor bodies 10 may be provided. An ultrasonic sensor having a configuration in which a plurality of sensor bodies 10 are arranged in an array is described hereinafter in a fifth embodiment.

1-1. Configuration of Substrate

The substrate 11 is formed from Si, for example, with a thickness dimension of 200 μm, for example. In this substrate 11, five openings 111 are formed for one ultrasonic reflecting member 17 as shown in FIGS. 1 through 3. Specifically, in a plan view of the substrate 11 as seen from the thickness direction (a sensor plan view) as shown in FIG. 1, the installed position of the ultrasonic reflecting member is the point of origin, the left-right direction of FIG. 1 is the X-axis direction, and the up-down direction is the Y-axis direction, in which case the openings 111 are provided at the respective coordinates (a, 0), (−a, 0), (0, a), (0, −a), and (0, 0).

The openings 111 are formed into circular shapes in the plan view of the substrate 11 as seen from the thickness direction of the substrate 11 (a sensor plan view), but the openings may also be formed into rectangular shapes or the like, for example. The openings 111 are shown as passing through the thickness direction of the substrate 11, but the openings 111 may also be concave grooves formed by etching or another method in the surface of the substrate 11 that faces the elastic portion 16 (the top side in FIGS. 2 and 3). Furthermore, a configuration is shown in which the support film 14 is formed on the substrate 11, but another option is a configuration in which concave grooves are formed by etching or another method in the surface of the substrate 11 on the side opposite the elastic portion 16 (the bottom side in FIGS. 2 and 3), wherein the bottoms of the grooves serve as the support film 14 and the groove interiors serve as the openings 111.

1-2. Configuration of Ultrasonic Array

The ultrasonic arrays 12 (12A, 12B, 12C, 12D, 12E) disposed in the inner side areas of the openings 111 in a sensor plan view. The first ultrasonic array 12A is disposed at the coordinates (a, 0), the second ultrasonic array 12B is disposed at the coordinates (−a, 0), the third ultrasonic array 12C is disposed at the coordinates (0, a), the fourth ultrasonic array 12D is disposed at the coordinates (0, −a), and the fifth ultrasonic array 12E is disposed at the coordinates (0, 0).

These ultrasonic arrays 12 are configured by aligning ultrasonic elements 20 in an array structure disposed at equal intervals in the XY direction, for example, the ultrasonic elements 20 being configured by the openings 111, the support film 14 (a membrane 141) which closes off the openings 111, and piezoelectric bodies 21 formed on the membrane 141. The ultrasonic elements 20 disposed in one ultrasonic array 12 are suitably designed depending on the size of the substrate 11, the size of the ultrasonic reflecting member 17, the signal strength of the transmitted ultrasonic waves, and other factors; e.g., four rows and four columns of ultrasonic elements 20 are disposed in the XY direction.

The support film 14 is formed from a two-layer structure including (not shown) an $SiO_2$ layer formed with a thickness of 3 μm, for example, on the substrate 11, and a $ZrO_2$ layer with a thickness of 400 nm, for example, layered over the $SiO_2$ layer. The $ZrO_2$ layer is a layer formed in order to prevent peeling of a hereinafter-described piezoelectric film 22 during the hereinafter-described baking formation of the ultrasonic array 12. Specifically, when the piezoelectric film 22 is formed from PZT, for example, if the $ZrO_2$ layer has not been formed at the time of baking, the Pb included in the piezoelectric film 22 diffuses, the melting point of the $SiO_2$ layer is lowered, air bubbles form on the surface of the $SiO_2$ layer, and these air bubbles cause the PZT to peel. When there is no $ZrO_2$ layer, other problems include a decrease of deflection efficiency in relation to the strain in the piezoelectric film 22. In response to this, it is possible to avoid the inconveniences of peeling of the piezoelectric film 22, decreasing of deflection efficiency, and other problems when the $ZrO_2$ layer is formed on the $SiO_2$ layer.

In the following description, the areas of the support film 14 that close off the openings 111 are referred to as the membrane 141 in the sensor plan view shown in FIG. 1.

Each piezoelectric body 21 is configured from a piezoelectric film 22, a bottom electrode 23 provided on the bottom surface of the piezoelectric film 22, and a top electrode 24 provided on the top surface of the piezoelectric film 22.

The piezoelectric films 22 are formed by forming PZT, for example (lead zirconate titanate), into a film with a thickness dimension of 500 nm, for example. PZT is used for the piezoelectric films 22 in the present embodiment, but any material may be used as long as the material is capable of generating a load due to stress changes in the film; for example, lead titanate ($PbTiO_3$), lead zirconate ($PbZrO_3$), lead lanthanum titanate ($(Pb, La) TiO_3$), aluminum nitride (AlN), zinc oxide (ZnO), polyvinylidene fluoride (PVDF), and the like may be used.

The bottom electrodes 23 and top electrodes 24 are electrodes formed by sandwiching the piezoelectric films 22 in the film thickness direction, wherein the bottom electrodes 23 are formed on the surfaces of the piezoelectric films 22 that face the membrane 141, and the top electrodes 24 are formed on the surfaces on the sides opposite those on which the bottom electrodes 23 are formed.

The bottom electrodes 23 are film electrodes formed with a thickness dimension of 200 nm, for example, and are formed in the membrane 141.

The top electrodes 24 are also film electrodes, formed with a thickness dimension of 50 nm, for example. The top electrodes 24 are formed covering the top surfaces of the piezoelectric films 22.

Also formed on the support film 14 are bottom electrode wires 23 (not shown) extending from the external peripheries, and top electrodes (not shown) extending from the external peripheries of the top electrodes 24. These electrode wires are extended to terminal pads (not shown) provided to the external periphery of the substrate 11, for example, and are connected from the terminal pads to the controller 30 which is described hereinafter.

The ultrasonic elements 20 of such an ultrasonic array 12 are vibrated by a signal (alternating-current voltage) inputted from the controller 30, and ultrasonic waves are transmitted either in the acoustic lens 15 (constituting the acoustic refracting part of the present invention) provided covering the ultrasonic arrays 12A to 12D or in the elastic portion 16 over the fifth ultrasonic array 12E. Specifically, when alternating-current voltage is applied from the controller 30 to the bottom electrodes 23 and the top electrodes 24, the piezoelectric films 22 expand and contract according to the applied voltage. The support film 14 thereby vibrates and ultrasonic waves are transmitted to the acoustic lens 15.

When ultrasonic waves are transmitted simultaneously from the plurality of ultrasonic elements 20, the ultrasonic waves strengthen each other, and ultrasonic waves propagated as a plane wave are transmitted in the form of a beam in a direction orthogonal to the substrate 11. At this time, the diameter of the ultrasonic array 12 in a sensor plan view is the beam diameter of the ultrasonic waves in beam form.

The ultrasonic array 12 receives the ultrasonic waves returning from the acoustic lens 15 or the elastic portion 16, and outputs a reception signal to the controller 30. Specifically, when ultrasonic waves are inputted from the acoustic lens 15 and the support film 14 while voltage is not being applied to the electrodes 23 and 24, the piezoelectric films 22 expand and contract due to the vibration of the support film 14. An electric potential difference between the bottom electrodes 23 and top electrodes 24 of the piezoelectric films 22 is created according to the amount of expansion and contraction, electric currents from the piezoelectric films 22 flow to the bottom electrodes 23 and the top electrodes 24, and an electric signal (a reception signal) is outputted.

1-3. Configuration of Acoustic Lens

The acoustic lens 15 is formed over the ultrasonic arrays 12A to 12D on the substrate 11. The present embodiment presents an example of a configuration in which the acoustic lens 15 is not disposed over the fifth ultrasonic array 12E provided to a position overlapping the ultrasonic reflecting member 17 in a sensor plan view, but the flat plate-shaped acoustic lens 15 may be provided over the fifth ultrasonic array 12E, for example.

This acoustic lens 15 refracts the ultrasonic waves transmitted from the ultrasonic arrays 12A to 12D toward the ultrasonic reflecting member 17.

In other words, the acoustic lens 15 comprises inclined flat surfaces 151 to 154 which are inclined so as to face the ultrasonic reflecting member 17 in areas directly above the ultrasonic arrays 12A to 12D (the emitted direction of the ultrasonic waves in beam form), and these inclined flat surfaces 151 to 154 refract and alter the traveling direction of the ultrasonic waves emitted from the ultrasonic arrays 12A to 12D. Such an acoustic lens 15 may be formed from a material whose acoustic impedance is different from the elastic portion 16; more specifically, the acoustic lens 15 and the elastic portion 16 are selected so that the propagation velocity of ultrasonic waves traveling through the acoustic lens 15 (the acoustic velocity in the acoustic lens 15) is faster than the propagation velocity of ultrasonic waves traveling through the elastic portion 16 (the acoustic velocity in the elastic portion 16. Possible examples of the elastic portion 16 include natural rubber (ultrasonic wave propagation velocity: 1500 m/s), silicone rubber (ultrasonic wave propagation velocity: 1000 m/s), and PDMS (Polydimethylsiloxane, ultrasonic wave propagation velocity: 900 to 1000 m/s), for example; and possible examples of the acoustic lens 15 include silicon (ultrasonic wave propagation velocity: 8400 m/s), quartz (ultrasonic wave propagation velocity: 5900 m/s), glass (ultrasonic wave propagation velocity: 4000 to 5300 m/s), nylon (ultrasonic wave propagation velocity: 2600 m/s), polystyrene (ultrasonic wave propagation velocity: 2350 m/s), and polyethylene (ultrasonic wave propagation velocity: 1900 m/s), for example.

The acoustic lens 15 comprises a first inclined flat surface 151 which faces the first ultrasonic array 12A and which is parallel to the Y axis and inclined at an angle $\theta_1$ ($0<\theta_1<90$) relative to the X axis, and a second inclined flat surface 152 which faces the second ultrasonic array 12B and which is parallel to the Y axis and inclined at an angle $\theta_1$ relative to the X axis, as shown in FIG. 2. The acoustic lens 15, similar in relation to the Y-axis direction, also comprises a third inclined flat surface 153 which faces the third ultrasonic array 12C and which is parallel to the X axis and inclined at an angle $\theta_1$ relative to the Y axis, and a fourth inclined flat surface 154 which faces the fourth ultrasonic array 12D and which is parallel to the X axis and inclined at an angle $\theta_1$ relative to the Y axis, as shown in FIG. 3.

Figure 4:
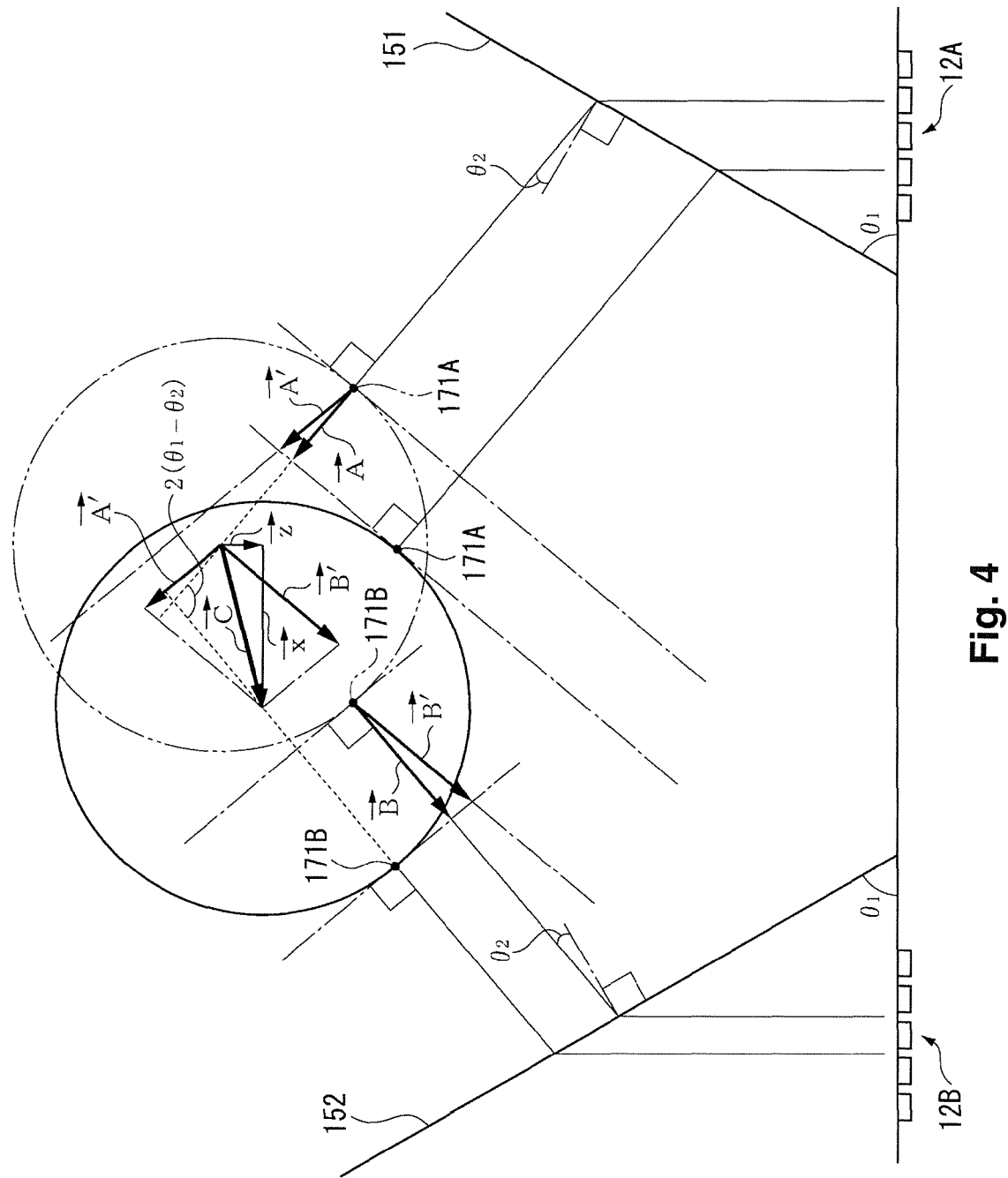
FIG. 4 is a drawing showing the refraction of ultrasonic waves occurring in the border between inclined flat surfaces of the acoustic lens, and the path of ultrasonic waves reflected by the ultrasonic reflecting member.

FIG. 4 is a drawing showing the refraction of ultrasonic waves occurring in the border between the inclined flat surfaces 151, 152 of the acoustic lens 15, and the path of ultrasonic waves reflected by the ultrasonic reflecting member 17. In the ultrasonic reflecting member 17 shown in FIG. 4, the double-dashed lines indicate the initial position in which there is no strain in the elastic portion 16, and the solid lines indicate the moved position when the ultrasonic reflecting member 17 has moved due to strain in the elastic portion 16.

As described above, when ultrasonic waves are emitted from the ultrasonic array 12 in a direction orthogonal to the substrate 11 toward the inclined flat surfaces 151 to 154 inclined at an angle $\theta_1$ relative to the X or Y axis, the ultrasonic waves are refracted in the borders between the inclined flat surfaces 151 to 154 and the elastic portion 16 as shown in FIG. 4.

At this time, with C1 representing the acoustic velocity in the acoustic lens 15 and C2 representing the acoustic velocity in the elastic portion 16, based on Snell's law, the angle of refraction is $\theta_2$ relative to the normal directions of the inclined flat surfaces 151 to 154 as shown by equation (1) described above. Therefore, if the ultrasonic reflecting member 17 is angled at $\theta_2$ relative to the normal directions of the inclined flat surfaces 151 to 154, the ultrasonic waves emitted from the ultrasonic array 12 reach the ultrasonic reflecting member 17 where they are reflected.

1-4. Configuration of Elastic portion and Ultrasonic Wave Reflector

The elastic portion 16, which is a film formed over a support film 14 and ultrasonic array 12 such as those described above, also functions as a protective film of the fifth ultrasonic array 12E. PDMS (PolyDiMethylSiloxane), for example, is used as the elastic portion 16 in the present embodiment, but the elastic portion 16 is not limited thereto and may be an elastic synthetic resin whose velocity of ultrasonic waves propagating through the medium is less than that of the acoustic lens 15. The thickness dimension of the elastic portion 16 (the dimension from the surface of the substrate 11 to the surface of the elastic portion 16) is not particularly limited, and is formed at 300 μm, for example).

A contact layer 161 is formed on the surface of the elastic portion 16 as shown in FIGS. 2 and 3. This contact layer 161 must always have a certain friction coefficient in order to transmit shearing force to and induce strain in the elastic portion 16 when a contact object comes into contact and causes displacement in the shearing direction, and the contact layer 161 is preferably formed from a replaceable film material or the like. When the ultrasonic waves transmitted from the ultrasonic array 12 are reflected by the contact layer 161, there is a risk of the ultrasonic waves being diffusely reflected in the elastic portion 16 and the measurement precision of the ultrasonic array 12 decreasing. Therefore, the contact layer 161 is preferably formed into a shape which absorbs ultrasonic waves or diffuses them in its surface. Possible examples of such a contact layer 161 include, felt nonwoven fabric, and a PET film to whose interior is bonded a polymer made porous by mixing in silica or the like.

The ultrasonic reflecting member 17 is embedded within the elastic portion 16 at a position with the coordinates (0, 0). This ultrasonic reflecting member 17 has a different acoustic impedance from the elastic portion 16. Therefore, ultrasonic waves traveling through the elastic portion 16 are reflected by the surface of the ultrasonic reflecting member 17.

This ultrasonic reflecting member 17 is formed into a spherical shape as shown in FIGS. 1 through 3. With such an ultrasonic reflecting member 17, if the center point of the ultrasonic reflecting member 17 lies within the beam diameter of the ultrasonic wave beam, the normal line direction of any point on the spherical surface of the ultrasonic reflecting member 17 is the same direction as the traveling direction of the ultrasonic wave beam, and the ultrasonic waves can be reflected in their original path.

1-5. Configuration of Controller

Figure 6:
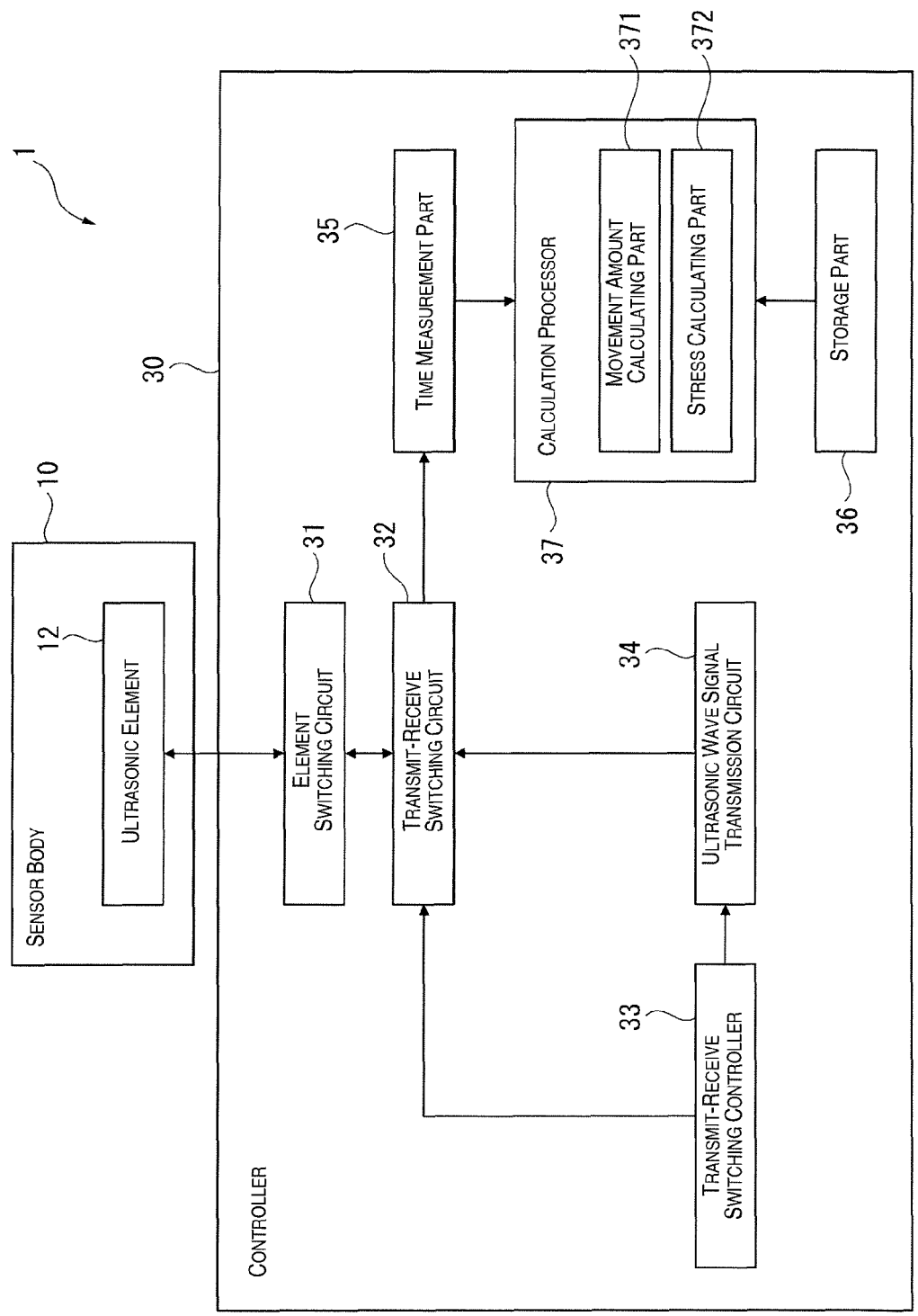
FIG. 6 is a block diagram showing the schematic configuration of the tactile sensor of the first embodiment.

FIG. 6 is a block diagram showing the schematic configuration of the tactile sensor 1.

The controller 30 comprises, as shown in FIG. 6, an element switching circuit 31, a transmit-receive switching circuit 32, a transmit-receive switching controller 33, an ultrasonic wave signal transmission circuit 34, a time measurement part 35, a storage part 36, and a calculation processor 37. The ultrasonic wave transmission controller of the present invention is composed of the element switching circuit 31, the transmit-receive switching circuit 32, the transmit-receive switching controller 33, and the ultrasonic wave signal transmission circuit 34.

The element switching circuit 31 is a switching circuit for switching the ultrasonic arrays 12 that are driven amongst the five ultrasonic arrays 12 of the sensor body 10.

In the tactile sensor 1 of the present embodiment, while the transmission and reception of ultrasonic waves is being performed from one ultrasonic array 12, the outputting of drive signals to the other ultrasonic arrays 12 is not being performed, nor is the reception of reception signals from the other ultrasonic arrays 12. It is thereby possible in the ultrasonic array 12 that is the drive target to avoid the inconvenience of ultrasonic waves transmitted from the other ultrasonic arrays 12 being received and noise being detected, as well as the inconvenience of reception signals being detected from the ultrasonic arrays 12 that are not the drive target.

The element switching circuit 31 comprises terminal groups connected to the bottom electrode wires and top electrode wires of the ultrasonic arrays 12 for example, and the terminal group corresponding to the ultrasonic array 12 corresponding to a command signal is connected with the transmit-receive switching circuit 32 based on the command signal which is inputted from the transmit-receive switching controller 33. The terminal groups corresponding to the ultrasonic arrays 12 not being driven may also be configured so as to not be driven due to both the bottom electrode wires and top electrode wires being connected to GND, for example.

The transmit-receive switching circuit 32 is a switching circuit for switching the connection state based on a mode switching signal inputted from the transmit-receive switching controller 33.

Specifically, when a control signal indicating a switch to ultrasonic wave transmission mode is inputted from the transmit-receive switching controller 33, the transmit-receive switching circuit 32 is switched to a switching state in which drive signals inputted from the ultrasonic wave signal transmission circuit 34 can be outputted to the ultrasonic arrays 12A to 12E of the sensor body 10.

When a control signal indicating to switch to ultrasonic wave reception mode is inputted from the transmit-receive switching controller 33, the transmit-receive switching circuit 32 is switched to a switching state in which reception signals inputted from the ultrasonic arrays 12A to 12E of the sensor body 10 can be outputted to the time measurement part 35.

The transmit-receive switching controller 33 switches between ultrasonic wave transmission mode for transmitting ultrasonic waves from the ultrasonic arrays 12 and ultrasonic wave reception mode for receiving ultrasonic waves in the ultrasonic arrays 12.

Specifically, when the power source of the tactile sensor 1 is switched to ON, for example, the transmit-receive switching controller 33 first performs a process of switching to ultrasonic wave transmission mode. In this process, the transmit-receive switching controller 33 outputs a control signal indicating to switch to ultrasonic wave transmission mode to the transmit-receive switching circuit 32, and outputs a control signal indicating to output a drive signal from the ultrasonic wave signal transmission circuit 34. The transmit-receive switching controller 33 observes the time measured by a timing part (a timer) (not shown), and performs a process of switching to ultrasonic wave reception mode after a predetermined transmission time has elapsed since the ultrasonic wave transmission mode. The transmission time may be set approximately to the time during which burst waves of a frequency of 1 to 2, for example, are transmitted from the ultrasonic arrays 12. In ultrasonic wave reception mode, the transmit-receive switching controller 33 outputs a control signal indicating to switch to ultrasonic wave reception mode to the transmit-receive switching circuit 32, and switches the transmit-receive switching circuit 32 to a connection state in which reception signals inputted from the ultrasonic arrays 12 can be inputted to the time measurement part 35.

In transmission mode, when a control signal indicating to output a drive signal is inputted from the transmit-receive switching controller 33, the ultrasonic wave signal transmission circuit 34 outputs a drive signal (a drive pulse) for driving the ultrasonic arrays 12 to the transmit-receive switching circuit 32.

The time measurement part 35 observes the time measured by the timing part and measures the time until the ultrasonic waves will be received.

Specifically, the time measurement part 35 counts the ultrasonic wave transmission timing at which the transmit-receive switching controller 33 has performed the process of switching to ultrasonic wave transmission mode, i.e. the time since ultrasonic waves were transmitted from the ultrasonic arrays 12. The transmit-receive switching controller 33 resets the time counted by the timing part with the ultrasonic wave transmission timing. The transmit-receive switching controller 33 then performs the process of switching to ultrasonic wave reception mode, and when a reception signal corresponding to the reflected ultrasonic waves received in the ultrasonic arrays 12 is inputted from the transmit-receive switching circuit 32 to the time measurement part 35, the time measurement part 35 acquires the time at the inputted timing (TOF data: Time Of Flight data). The acquired TOF data is inputted to the calculation processor 37.

The storage part 36 stores various programs, various data, and the like for performing the various processes of the calculation processor 37.

Specifically, the Young's modulus of the elastic portion 16, the acoustic velocity of ultrasonic waves in the elastic portion 16, various programs performed by the calculation processor 37, and the like are stored in the storage part 36. The various data calculated by the calculation processor 37 may also be stored. Furthermore, the storage part 36 may also store the inclination angle $\theta_1$ of the inclined flat surfaces 151 to 154 of the acoustic lens 15 relative to the substrate 11, and the angle $\theta_2$ of ultrasonic waves refracted by the ultrasonic reflecting member 17.

The calculation processor 37 comprises a movement amount calculating part 371 and a stress calculating part 372. Specifically, the calculation processor 37 is configured from a central calculation circuit, memory or another storage circuit, and the like. For example, the calculation processor 37 functions as the movement amount calculating part 371 by the performing of a process when a movement amount calculation program stored in the storage part 36 is read by the central calculation circuit, and the calculation processor 37 functions as the stress calculating part 372 by the performing of a process when a stress calculation program stored in the storage part 36 is read by the central calculation circuit.

The movement amount calculating part 371 calculates the movement amount of the ultrasonic reflecting member, i.e. the amount of strain in the elastic portion 16, based on the TOF data inputted from the time measurement part 35 and the acoustic velocity in the elastic portion 16 stored in advance in the storage part 36.

The stress calculating part 372 calculates the stress acting on the elastic portion 16 based on the amount of strain in the elastic portion 16 calculated by the movement amount calculating part 371 and the Young's modulus of the elastic portion 16 stored in advance in the storage part 36.

The details of the strain amount calculation method of the movement amount calculating part 371 (the method of calculating the movement amount of the ultrasonic reflecting member 17) and the stress calculation method of the stress calculating part 372 are described hereinafter.

2. Actions of Tactile Sensor

Next, the actions of measuring positive pressure force and shearing force by the tactile sensor 1 described above are described in detail based on FIGS. 7 and 8. The description herein is simplified because detection of the movement amount of the ultrasonic reflecting member 17 in the Y-axis direction and detection of the shearing force acting on the elastic portion 16 in the Y-axis direction can be calculated by the same process as detection of the movement amount in the X-axis direction and detection of the shearing force acting on the elastic portion 16 in the Y-axis direction.

Figure 7:
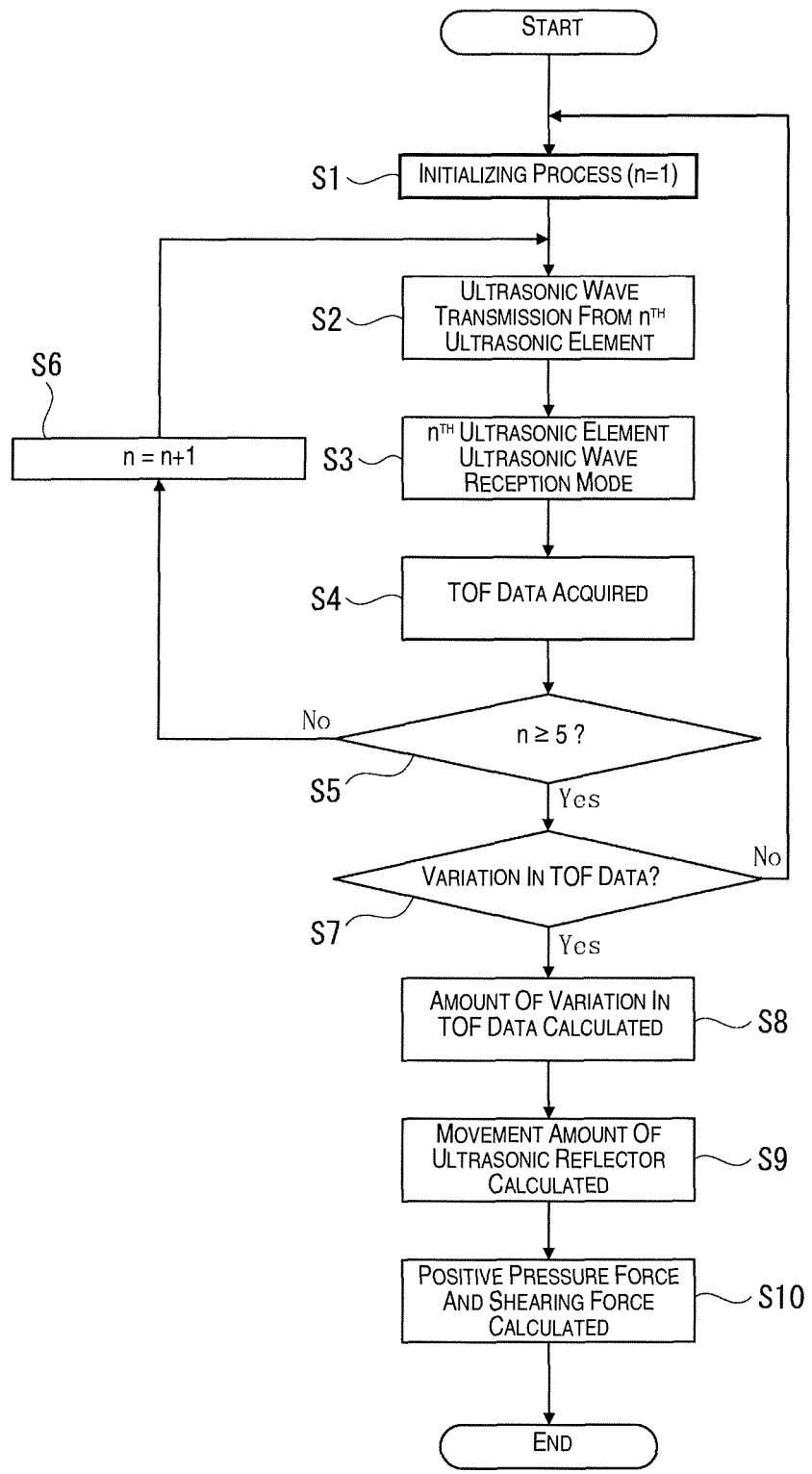
FIG. 7 is a flowchart of the stress calculation process in the tactile sensor of the first embodiment.
Figure 8:
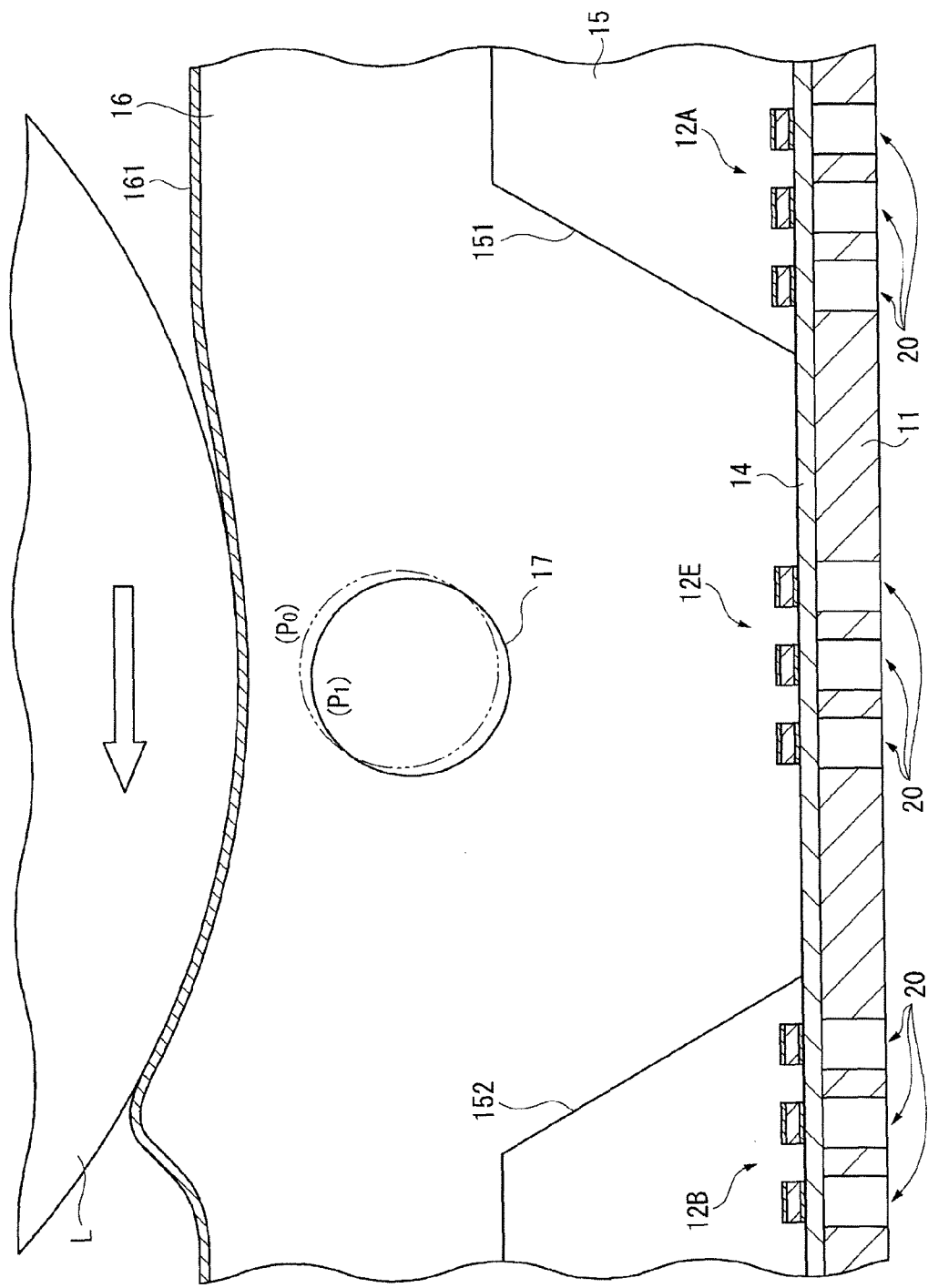
FIG. 8 is a cross-sectional view showing a state in FIG. 2 wherein a contact object has come in contact with the elastic portion and the ultrasonic reflecting member has moved.

FIG. 7 is a flowchart of the stress calculation process in the tactile sensor 1 of the first embodiment. FIG. 8 is a cross-sectional view showing a state in the tactile sensor 1 shown in FIG. 2, wherein a contact object L has come in contact with the elastic portion 16 and the elastic portion 16 has elastically deformed.

In the actions of detecting positive pressure force and shearing force by the tactile sensor 1, the controller 30 first performs a process of initializing an element setting variable n (n=0) (step S1), as shown in FIG. 7.

The controller 30 then performs a process of driving the ultrasonic element corresponding to the element setting variable n and acquiring the TOF data.

Specifically, the transmit-receive switching controller 33 of the controller 30 switches to ultrasonic wave transmission mode. In other words, the transmit-receive switching controller 33 switches the element switching circuit 31 to a state capable of signal transmission and reception with an nth ultrasonic array 12, and blocks both transmission of drive signals to other ultrasonic arrays 12 and reception of reception signals from other ultrasonic arrays 12. The transmit-receive switching controller 33 also switches the transmit-receive switching circuit 32 to a state capable of outputting drive signals to the ultrasonic arrays 12, and causes drive signals to be generated in the ultrasonic wave signal transmission circuit 34 and outputted to the transmit-receive switching circuit 32. Ultrasonic waves in 1 to 2 bursts are thereby transmitted from the nth ultrasonic array 12 (step S2). With this ultrasonic wave transmission timing, the transmit-receive switching controller 33 resets the timer.

The transmit-receive switching circuit 32 then switches to ultrasonic wave reception mode, and switches the transmit-receive switching circuit 32 to a state capable of outputting the reception signal inputted from the ultrasonic array 12 to the time measurement part 35 (step S3).

When a reception signal is inputted, the time measurement part 35 thereby acquires the time of the timer, i.e., acquires the time (TOF data) until the ultrasonic waves return to the ultrasonic array 12 after being transmitted from the ultrasonic array 12 and reflected by the ultrasonic reflecting member 17 (step S4). The time measurement part 35 also stores the acquired TOF data in the storage part 36.

Acquired TOF data is accumulated and stored in the storage part 36 in order to perform a process of comparing the previously stored TOF data and the newly stored TOF data. For example, the TOF data acquired in set m−1 of the loop and the TOF data acquired in set m of the loop are stored in the storage part 36.

Next, the controller 30 determines whether or not the value of the element setting variable n is 5 (the number of ultrasonic arrays 12 provided to the sensor body 10) (step S5).

When the controller 30 has determined that the element setting variable n is 4 or less, 1 is added to the element setting variable n (step S6), and the processes of steps S2 through S4 are repeated.

When the controller 30 determines the element setting variable n to be 5 or greater, the controller 30 determines whether or not the acquired TOF data has varied from the previously acquired TOF data (step S7). In a state in which the tactile sensor 1 has been driven for the first time, such as when a power source is added, for example, only the TOF data acquired in the set 1 of the loop is stored, the process of step S1 is therefore resumed, the processes of steps S1 through S5 are performed again, and the TOF data of set 2 of the loop is acquired.

When there is no variation in the TOF data stored in the storage part 36, i.e., when the difference between the TOF data of set m−1 of the loop and the TOF data of set m of the loop is within a preset threshold range, the controller 30 again performs the processes of steps S1 through S5 (the processes of set m+1 of the loop).

In step S7, when the difference between the TOF data of set m−1 of the loop and the TOF data of set m of the loop is equal to or greater than the threshold, the controller 30 performs a process of calculating the amount of variation in the TOF data (step S8).

Thus, when there is variation in the acquired TOF data, the tactile sensor 1 deduces that a contact object L has come in contact with the elastic portion 16 and the elastic portion 16 has elastically deformed as shown in FIG. 8.

The movement amount calculating part 371 then calculates the movement amount of the ultrasonic reflecting member 17 based on the calculated amount of variation in the TOF data (step S9).

In this step S9, the movement amount of the ultrasonic reflecting member 17 is calculated in the following manner.

Specifically, when the TOF data is $T_0$ while the ultrasonic reflecting member 17 is positioned in an initial position $P_0$ and the TOF data is $T_1$ when the ultrasonic reflecting member 17 has moved to a position $P_1$, the movement amount calculating part 371 calculates the movement amount M relative to the variation amount of the TOF data by the equation below. The path whereby the ultrasonic waves transmitted from an ultrasonic array 12 are reflected by a reflection point 171 and returned to the transmitting ultrasonic array 12 is different between when the ultrasonic reflecting member 17 is positioned in the initial position and when the ultrasonic reflecting member 17 is positioned in the moved position; therefore, the distances (times) whereby the ultrasonic waves pass through the acoustic lens 15 and the distances (times) whereby the ultrasonic waves pass through the elastic portion 16 are also different, but the difference between the distances (times) whereby the ultrasonic waves pass through the acoustic lens 15 is extremely small and can be ignored in the calculation of the movement amount of the ultrasonic reflecting member 17.

Equation (2)

$$M = \frac{C_2 \times (T_1 - T_0)}{2} \quad (2)$$

In Equation (2) above, the acoustic velocity $C_2$ in the elastic portion 16 is stored in advance in the storage part 36.

Since the ultrasonic reflecting member 17 is spherical, the normal direction of one reflecting point on the surface of the ultrasonic reflecting member 17 is the same as the incident direction on the ultrasonic reflecting member 17 of ultrasonic waves transmitted from one ultrasonic array 12. Therefore, with a first reflection point 171A representing the reflection point of ultrasonic waves transmitted from the first ultrasonic array 12A and a second reflection point 171B representing the reflection point of ultrasonic waves transmitted from the second ultrasonic array 12B as shown in FIGS. 2 through 4, the ultrasonic waves reflected at these reflection points 171A, 171B first arrive back at their respective original ultrasonic wave transmission sources, the ultrasonic arrays 12A, 12B.

Therefore, the movement amount M determined by Equation (2) above is the movement amount of the ultrasonic reflecting member 17 in a normal direction in a tangent plane of a reflection point 171 (171A, 171B), and the respective amounts can be shown by a first normal vector (A) and a second normal vector (B).

Figure 5:
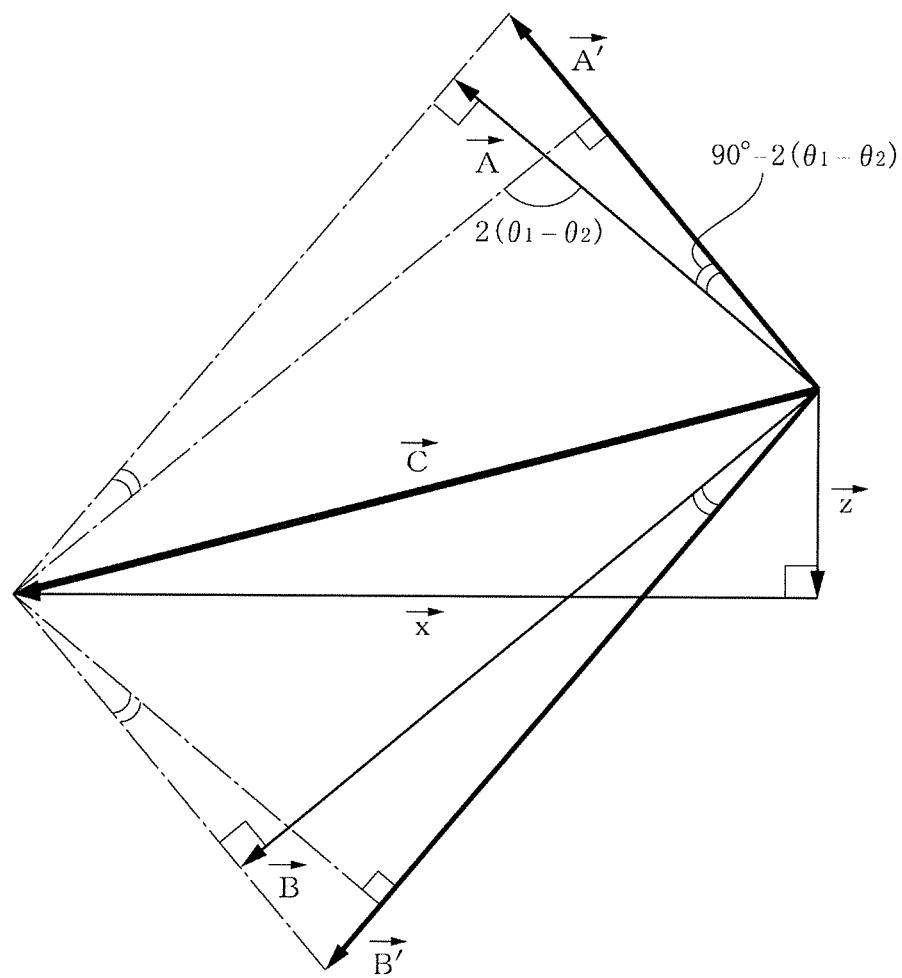
FIG. 5 is a drawing showing the movement directions and movement amounts in the ultrasonic reflecting member in a vector display shown in FIG. 4.

FIG. 5 is a drawing showing the movement directions and movement amounts of ultrasonic reflecting member in FIG. 4.

The movement vector of the ultrasonic reflecting member 17 in the XZ plane (the XZ movement vector (C)) is expressed as a resultant vector of a vector (a first calculated vector (A')) having a scalar quantity of a size obtained by dividing the scalar quantity of the first normal vector (A) by $\cos\{90-2(\theta_1-\theta_2)\}$ in the same direction as the normal direction of the first normal vector (A) at the second reflection point 171B, and a vector (a second calculated vector (B')) having a scalar quantity of a size obtained by dividing the scalar quantity of the second normal vector (B) by $\cos\{90-2(\theta_1-\theta_2)\}$ in the same direction as the normal direction of the second normal vector (B) at the first reflection point 171A, as shown in FIGS. 4 and 5. The vector formula is as follows.

Equation (3)

$$\vec{C} = \vec{A}' + \vec{B}' = \vec{x} + \vec{z} \quad (3)$$

Due to the incident angle $\theta_1$ and the emission angle $\theta_2$ of ultrasonic waves relative to the inclined flat surfaces 151 to 154 being stored in advance in the storage part 36, the movement amount calculating part 371 can determined the first calculated vector (A') and the second calculated vector (B') through calculation.

The movement amount calculating part 371 can calculate the coordinate position of the ultrasonic reflecting member 17 after movement by calculating the XZ movement vector (C), based on the vector formula shown in Equation (3) above. Furthermore, the movement amount calculating part 371 deconstructs the XZ movement vector (C) into an X shearing direction vector (x) which is a component running along the X-axis direction, and a positive pressure direction vector (z) which is a component running along the Z-axis direction. The absolute value of the X shearing direction vector (x) is the movement amount of the ultrasonic reflecting member 17 along the X-axis direction as well as the amount of strain in the elastic portion 16 in the X-axis direction. The absolute value of the positive pressure direction vector (z) is the movement amount of the ultrasonic reflecting member 17 along the Z-axis direction as well as the amount of strain in the elastic portion 16 in the Z-axis direction.

Furthermore, the ultrasonic waves outputted from the fifth ultrasonic array 12E are transmitted along the thickness direction of the substrate 11 and reflected by the reflection point 171E nearest to the substrate 11 in the ultrasonic reflecting member 17. Therefore, when the movement amount is calculated from the amount of variation in the TOF data based on the reception signal outputted from the fifth ultrasonic array 12E, the movement amount of the ultrasonic reflecting member 17 along the Z-axis direction can be calculated.

This movement amount along the Z-axis direction can be calculated based on reception signals from the first through fourth ultrasonic arrays 12A to 12D, but a more precise value can be acquired by calculating based on a reception signal from the fifth ultrasonic array 12E. This is because the distance between the fifth ultrasonic array 12E and the ultrasonic reflecting member 17 is less than the distances between the other ultrasonic arrays 12A to 12D and the ultrasonic reflecting member 17, there is less attenuation and other effects on the ultrasonic waves, and there is also less attenuation caused by reflection and other effects on the ultrasonic waves in the border between the acoustic lens 15 and the elastic portion 16 because the ultrasonic waves do not pass through the acoustic lens 15.

Therefore, the movement amount calculating part 371 compares the measured movement amount of the ultrasonic reflecting member 17 in the Z-axis direction as calculated from the reception signal outputted from the fifth ultrasonic array 12E and the calculated movement amount in the Z-axis direction as calculated based on Equation (2), and when the difference is equal to or greater than a prescribed value that has been set in advance, the measured movement amount is set as the movement amount in the Z-axis direction. In this case, the movement amount calculating part 371 may perform a process of setting the positive pressure direction vector (z) based on the measured movement amount and compensating for the X shearing direction vector (x) based on Equation (2).

Above is described an example of a case in which the ultrasonic reflecting member 17 moves only in the ZX direction, wherein the movement amount of the ultrasonic reflecting member 17 in the Z-axis direction (the amount of strain in the elastic portion 16 in the Z-axis direction) and the movement amount of the ultrasonic reflecting member 17 in the X-axis direction (the amount of strain in the elastic portion 16 in the X-axis direction) are calculated by the movement amount calculating part 371, but the movement amount of the ultrasonic reflecting member 17 in the Y-axis direction can also be calculation by the same method.

In other words, the movement amount calculating part 371 calculates the movement amount in the normal direction of the third reflection point 171C (a third normal vector) from the amount of variation in the TOF data based on the reception signal outputted from the third ultrasonic array 12C. The movement amount calculating part 371 also calculates the movement amount in the normal direction of the fourth reflection point 171D (a fourth normal vector) from the amount of variation in the TOF data based on the reception signal outputted from the fourth ultrasonic array 12D. In the YZ plane, calculations are made of a vector (a third calculated vector) having a scalar quantity of a size obtained by dividing the scalar quantity of the third normal vector by $\cos\{90-2(\theta_1-\theta_2)\}$ in the same direction as the normal direction of the third normal vector at the fourth reflection point 171D, and a vector (a fourth calculated vector) having a scalar quantity of a size obtained by dividing the scalar quantity of the fourth normal vector by $\cos\{90-2(\theta_1-\theta_2)\}$ in the same direction as the normal direction of the fourth normal vector at the third reflection point 171C, and their resultant YZ movement vector is calculated.

The movement amount calculating part 371 further deconstructs the YZ movement vector into a positive pressure direction vector as a Z-axis direction component and a Y shearing direction vector as a Y-axis direction component. This positive pressure direction vector is the amount of strain in the elastic portion 16 in the Z-axis direction, and the Y shearing direction vector is the amount of strain in the elastic portion 16 in the Z-axis direction.

The movement amount calculating part 371 may also calculate the movement direction and movement amount of the ultrasonic reflecting member 17 in the XY plane by combining the Y shearing direction vector and the X shearing direction vector calculated as described above.

The movement amount calculating part 371 stores the calculated movement amount of the ultrasonic reflecting member 17 in the storage part 36.

After step S9, the stress calculating part 372 of the controller 30 calculates the stress that acts on the elastic portion 16 (step S10).

Specifically, the stress calculating part 372 reads the Young's modulus of the elastic portion 16 stored in the storage part 36, and calculates the shearing force in the X-axis direction by multiplying the Young's modulus by the amount of strain in the elastic portion 16 in the X-axis direction calculated by the movement amount calculating part 371.

The stress calculating part 372 also calculates the positive pressure force by multiplying the Young's modulus by the amount of strain in the elastic portion 16 in the Z-axis direction calculated by the movement amount calculating part 371.

The stress calculating part 372 similarly calculates the shearing force in the Y-axis direction by multiplying the Young's modulus by the amount of strain in the elastic portion 16 in the Y-axis direction calculated by the movement amount calculating part 371. When the movement amount of the ultrasonic reflecting member in the XY plane has been calculated, the resultant force of the X-axis direction shearing force and Y-axis direction shearing force can be calculated by multiplying the Young's modulus by the movement amount.

The stress calculating part 372 then stores the calculated positive pressure force and shearing force in the storage part 36.

3. Operational Effects of First Embodiment

As described above, the tactile sensor 1 of the first embodiment comprises a sensor body 10 and a controller 30 for controlling the sensor body 10. The sensor body 10 comprises a substrate 11, five ultrasonic arrays 12 (12A to 12E) which are provided on the substrate 11 and which transmit ultrasonic waves that propagate as plane waves in a direction orthogonal to the substrate 11, an elastic portion 16 which covers the ultrasonic arrays 12, and an ultrasonic reflecting member 17 embedded in the elastic portion 16, wherein an acoustic lens 15 for refracting the transmitted ultrasonic waves toward the ultrasonic reflecting member is provided on the ultrasonic arrays 12A to 12D.

In the tactile sensor having this configuration, the movement amounts and movement directions of the ultrasonic reflecting member can be detected based on the amounts of variation in TOF data obtained from the ultrasonic arrays 12, and the stress acting on the elastic portion 16 can be calculated by multiplying the Young's modulus of the elastic portion 16 by these movement amounts.

Since the configuration merely has the ultrasonic arrays 12, the acoustic lens 15, and the elastic portion 16 stacked on the substrate 11, the configuration can be simplified, productivity can be improved, and production costs can be reduced in comparison with cases such as when a three-dimensional shearing force detection structural body is provided, for example. Since the ultrasonic waves transmitted from the ultrasonic arrays 12 are refracted toward the ultrasonic reflecting member 17 by the acoustic lens 15 and their direction of travel is changed, there is no need for a process of staggering the ultrasonic wave transmission timings of the ultrasonic elements 20 constituting the ultrasonic arrays 12 to vary the directivity of the ultrasonic waves, for example, nor is there a need for a configuration of a signal delay circuit or the like, and the configuration can be simplified.

In the tactile sensor 1 of the present embodiment, since the ultrasonic reflecting member 17 is spherical, if the ultrasonic reflecting member 17 is positioned within the diameter of the ultrasonic wave beam transmitted from the ultrasonic arrays 12, the normal direction of a tangent plane of any one reflection point on the spherical surface will inevitably be the same as the traveling direction of the ultrasonic wave beam. Therefore, the ultrasonic waves reflected at this reflection point will inevitably return first to the ultrasonic arrays 12 from which they were transmitted.

Therefore, by acquiring the TOF data and the timing with which these ultrasonic waves are received, it is possible in the XZ plane, for example, to calculate the first normal vector (A), which is the movement amount in the normal direction of the first reflection point 171A which is the reflection point of ultrasonic waves transmitted from the first ultrasonic array 12A, as well as the second normal vector (B), which is the movement amount in the normal direction of the second reflection point 171B which is the reflection point of ultrasonic waves transmitted from the second ultrasonic array 12B. Therefore, the first calculated vector (A') and the second calculated vector (B') can be calculated based on the first normal vector (A), the second normal vector (B), and the incident angle $\theta_1$ and emission angle $\theta_2$ of the ultrasonic waves, and the XZ movement vector (C) of the ultrasonic reflecting member 17 can easily be calculated merely by calculating the resultant vector of the first calculated vector (A') and the second calculated vector (B').

Similarly, in the YZ plane, it is possible to calculate a third normal vector, which is the movement amount in the normal direction of a third reflection point which is the reflection point of ultrasonic waves transmitted from the third ultrasonic array 12C, as well as a fourth normal vector, which is the movement amount in the normal direction of a fourth reflection point which is the reflection point of ultrasonic waves transmitted from the fourth ultrasonic array 12D, and the YZ movement vector of the ultrasonic reflecting member 17 can easily be calculated.

By deconstructing the XZ movement vector and YZ movement vector into the positive pressure direction vector (z), the X shearing direction vector (x), and the Y shearing force direction vector, the movement amount calculating part 371 can easily calculate the amount of strain in the elastic portion 16 in the Z-axis direction, the amount of strain in the X-axis direction, and the amount of strain in the Y-axis direction.

Furthermore, since it is possible to similarly determine a fifth normal vector (E), which the movement direction in the normal direction of the fifth reflection point 171E which is the reflection point of ultrasonic waves transmitted from the fifth ultrasonic array 12E, the movement amount of the ultrasonic reflecting member 17 in the Z-axis direction can be measured directly.

Since the fifth ultrasonic array 12E is disposed in the nearest position to the substrate 11 and the ultrasonic reflecting member 17 is disposed directly above without being obstructed by the acoustic lens 15, the distance to the ultrasonic reflecting member 17 is less than the distances to the other ultrasonic arrays 12A to 12D. There is also no attenuation due to reflection or other effects on the ultrasonic waves, due to the acoustic lens 15 not being an obstruction. Therefore, highly precise TOF data can be acquired with this fifth ultrasonic array 12E. The movement amount can be measured with high precision by using such highly precise TOF data to measure the movement amount of the ultrasonic reflecting member 17 in the Z-axis direction.

Based on the movement amount in the Z-axis direction measured with such high precision, it is possible to compensate for the movement amount of the ultrasonic reflecting member 17 in the XY shearing direction and to perform measurements with higher precision.

In the tactile sensor 1 of the present embodiment, the controller 30 comprises the transmit-receive switching circuit 32, the transmit-receive switching controller 33, and the ultrasonic wave signal transmission circuit 34 which constitute the ultrasonic wave transmission controller; the time measurement part 35 which acquires TOF data based on reception signals acquired from the ultrasonic arrays 12; and the movement amount calculating part 371 which calculates the movement amount and movement direction of the ultrasonic reflecting member based on the amount of variation in the TOF data acquired by the time measurement part 35.

In this type of tactile sensor 1, as described above, the normal vectors which are the movement amounts of the ultrasonic reflecting member 17 in the normal directions of the reflection points can be calculated based on the TOF data acquired by the time measurement part 35, and based on the calculated vectors which are calculated using these normal vectors and the incident angles $\theta_1$ and emission angles $\theta_2$ of the ultrasonic waves, it is possible to easily calculate the movement amounts of the ultrasonic reflecting member 17 in the Z-axis direction, the X-axis direction, and the Y-axis direction; i.e., the amounts of strain in the elastic portion 16 in the X-, Y-, and Z-axis directions.

The controller 30 comprises the stress calculating part 372, and can easily calculate the stress acting on the elastic portion 16, i.e., the shearing force and positive pressure force acting on the elastic portion 16, from the Young's modulus of the elastic portion 16 and the amount of strain in the elastic portion 16 calculated by the movement amount calculating part 371.

Second Embodiment

Next, the tactile sensor 1 of the second embodiment of the present invention will be described based on the drawings.

Figure 9:
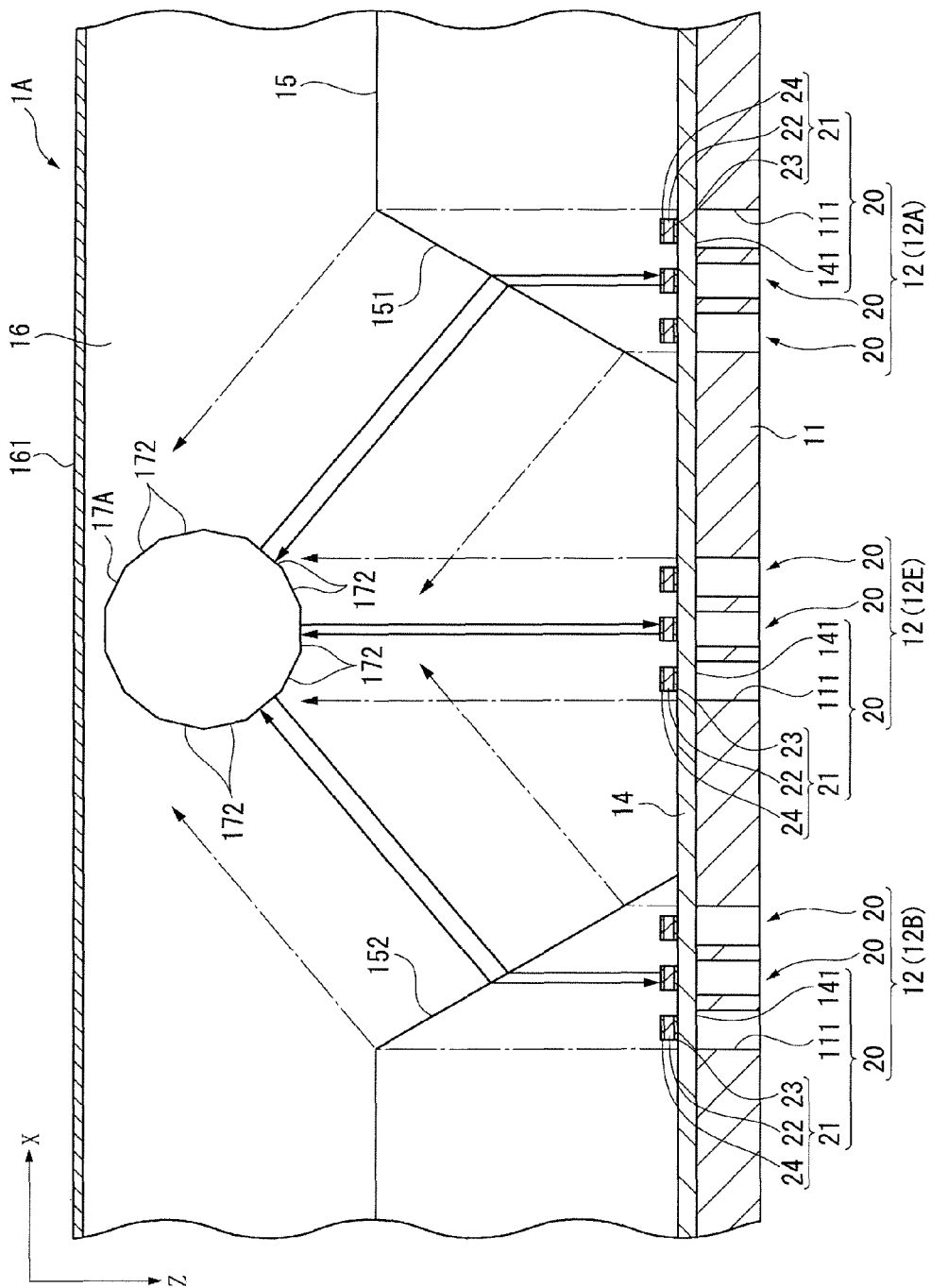
FIG. 9 is a cross-sectional view of a tactile sensor in the second embodiment.

In the first embodiment, an example was presented in which a spherical ultrasonic reflecting member 17 was used, but in the second embodiment, and example of a configuration is presented in which the ultrasonic reflecting member is in the shape of a polyhedron. FIG. 9 is a cross-sectional view of a tactile sensor 1A in the second embodiment. In the following description of the second embodiment, components identical to those of the first embodiment are denoted by the same symbols, and their descriptions are omitted or simplified.

Specifically, the ultrasonic reflecting member 17A of the tactile sensor 1A of the second embodiment is formed into the shape of a regular polyhedron in which a plurality of regular polygonal reflective surfaces 172 are combined to form a roughly spherical shape, as shown in FIG. 9.

Of the reflective surfaces 172 in this type of polyhedron-shaped ultrasonic reflecting member 17A, the reflective surfaces 172 that are orthogonal to the incident directions of ultrasonic waves transmitted from the ultrasonic arrays 12 and refracted by the acoustic lens 15 reflect the ultrasonic waves back to the ultrasonic arrays 12 from which they were transmitted. Therefore, in comparison with the ultrasonic reflecting member 17 of the first embodiment, the surface area returning reflected ultrasonic waves to the ultrasonic arrays 12 is greater, the acoustic pressure of the ultrasonic waves received by the ultrasonic arrays 12 is greater, and the reception signals are increased.

If there are fewer reflective surfaces constituting the ultrasonic reflecting member 17A, it means that the surface area of the reflective surfaces will increase, the acoustic pressure of the reflected ultrasonic waves will further increase, and there will be more components incident on the ultrasonic arrays 12 that were the source of transmitting the ultrasonic waves. There are also cases in which the ultrasonic reflecting member 17A rotates due to strain in the elastic portion 16. In such cases, when there are no reflective surfaces in the ultrasonic reflecting member 17A that are orthogonal to the incident direction of the ultrasonic waves, sometimes there will be less acoustic pressure of the reflected ultrasonic waves received by the ultrasonic arrays 12 and decreased detection precision.

In response to this, the more reflective surfaces constitute the ultrasonic reflecting member 17A, the nearer it will be to a spherical shape and the smaller the surface area reflecting ultrasonic waves, but even when the ultrasonic reflecting member 17A has rotated due to strain in the elastic portion 16, there is a high possibility that other reflective surfaces 172 will be orthogonal to the incident direction of the ultrasonic waves, and the decrease in detection precision can be suppressed.

Therefore, the number of reflective surfaces of the ultrasonic reflecting member 17A is preferably determined according to the Young's modulus of the elastic portion 16 and other factors, and in cases when the elastic portion 16 is soft and the ultrasonic reflecting member 17A rotates readily, for example, the configuration is preferably provided with an ultrasonic reflecting member 17A having a greater number of reflective surfaces.

Operational Effects of Second Embodiment

In the tactile sensor 1A of the second embodiment described above, the ultrasonic reflecting member 17A is formed into the shape of a polyhedron configured from a plurality of reflective surfaces 172. With such a configuration, the surface area reflecting ultrasonic waves can be increased, there is greater acoustic pressure of the ultrasonic waves reflected to the ultrasonic arrays 12 that originally transmitted the ultrasonic waves, and the precision of detecting the reception signals can be improved.

Third Embodiment

Next, a tactile sensor of the third embodiment of the present invention will be described based on the drawings.

Figure 10:
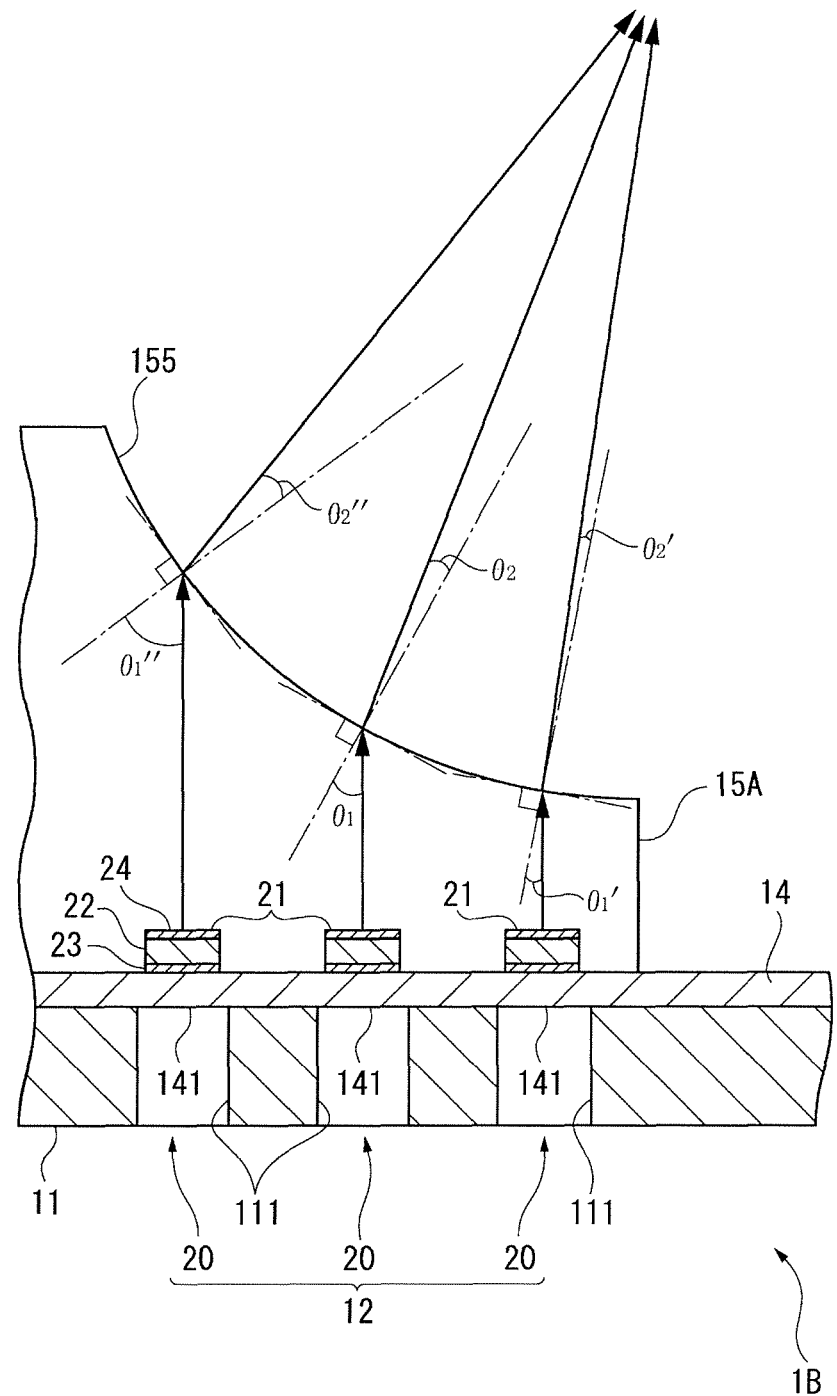
FIG. 10 is a cross-sectional view showing part of a tactile sensor of the third embodiment.

FIG. 10 is a cross-sectional view showing part of a tactile sensor 1B of the third embodiment.

In the tactile sensor 1 of the first embodiment described above, an example of a configuration was presented in which the acoustic lens 15 has inclined flat surfaces 151 to 154 that are inclined at an angle $\theta_1$ in relation to the substrate 11, but the acoustic lens 15A of the third embodiment has a concave surface 155 formed instead of the inclined flat surfaces 151 to 154.

Even when the acoustic lens 15A having this type of concave surface 155 is used, Snell's law shown in Equation (1) is satisfied as it is with the acoustic lens 15 of the first embodiment described above.

Therefore, with this acoustic lens 15A, the normal directions of the ultrasonic waves differ depending on their incident positions, and the ultrasonic waves collectively propagate so as to converge to a single point as shown in FIG. 10. In the tactile sensor 1B, the ultrasonic reflecting member 17 is provided at the convergent point of the ultrasonic waves. The curvature of the concave surface 155 may be set, for example, so that the ultrasonic waves converge at the center point of the ultrasonic reflecting member 17, or so that the ultrasonic waves converge at a reflection point 171.

In this type of acoustic lens 15A, the curvature of the concave surface 155 of the acoustic lens 15A is suitably set so that the ultrasonic waves transmitted from the ultrasonic arrays 12 converge in the ultrasonic reflecting member 17, for example. The curvature is set based on factors such as the velocity of ultrasonic waves propagating through the acoustic lens 15 and elastic portion 16, and the distance from the acoustic lens 15 to the ultrasonic reflecting member 17.

Operational Effects of Third Embodiment

In this type of tactile sensor 1B of the third embodiment, the acoustic lens 15A has a concave surface 155, and the traveling directions of the ultrasonic waves transmitted from the ultrasonic arrays 12 are refracted by the concave surface 155 so as to converge at a single point. Therefore, if the ultrasonic reflecting member 17 is provided to the convergent point of the ultrasonic waves, the strength of ultrasonic waves reflected by the ultrasonic reflecting member 17 increases as well, and reception strength can be improved.

Fourth Embodiment

Next, the fourth embodiment of the present invention will be described based on the drawings.

Figure 11:
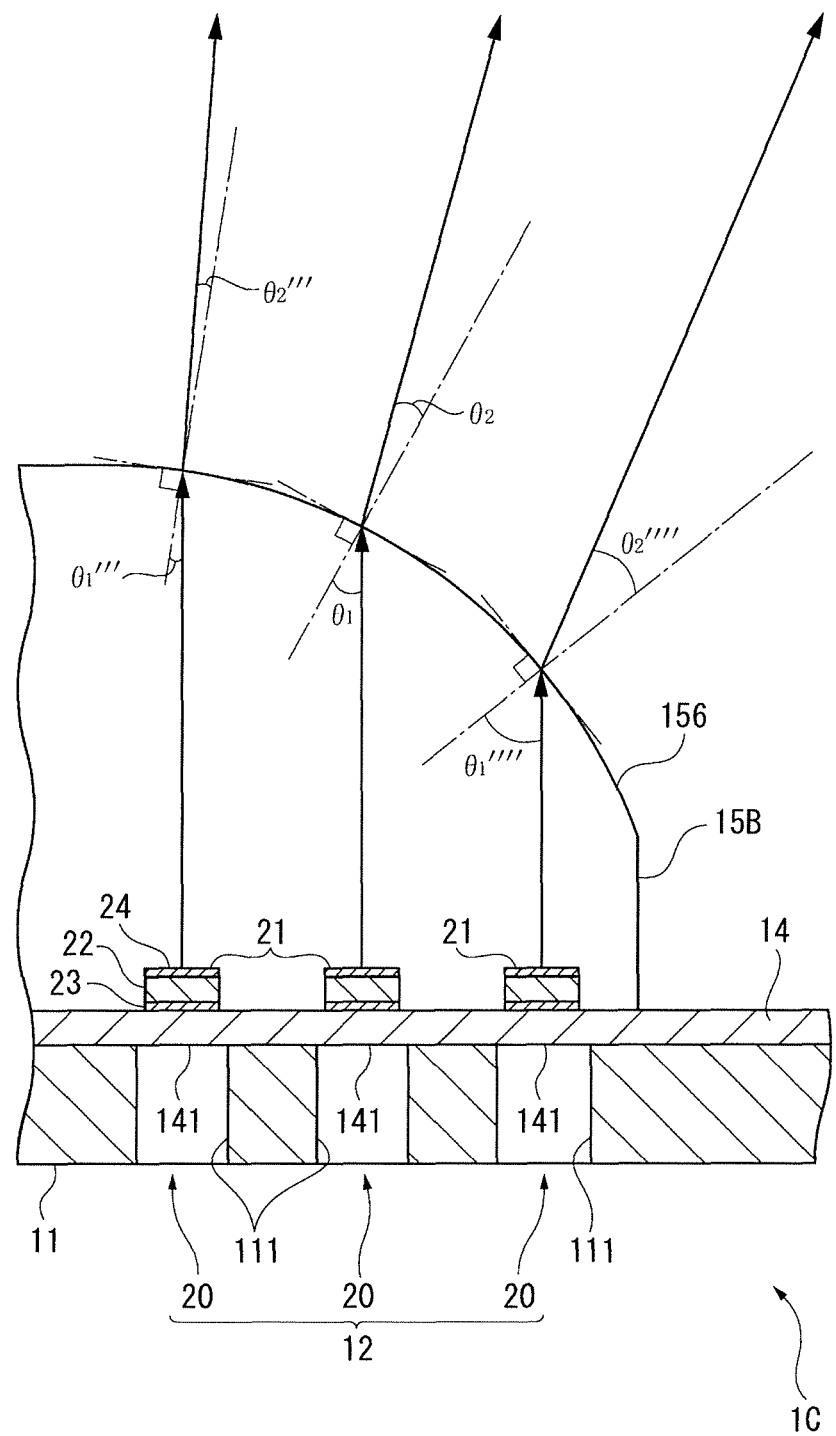
FIG. 11 is a cross-sectional view showing part of a tactile sensor of the fourth embodiment.

FIG. 11 is a cross-sectional view showing part of a tactile sensor 1C of the fourth embodiment.

In the tactile sensor 1B of the third embodiment described above, an example was presented in which the acoustic lens 15A has a concave surface 155 formed facing the ultrasonic arrays 12, but in the tactile sensor 1C of the fourth embodiment, a convex surface 156 that faces the ultrasonic arrays 12 is formed in the acoustic lens 15B.

Even when an acoustic lens 15A having this type of convex surface 156 is used, Snell's law shown in Equation (1) is satisfied as it is with the acoustic lens 15 of the first embodiment described above.

Therefore, with this acoustic lens 15A, ultrasonic waves transmitted from the ultrasonic arrays 12 are diffused and propagated through a wide range as shown in FIG. 11.

In this type of acoustic lens 15B, the curvature is preferably set so that ultrasonic waves can be diffused throughout the moveable range of the ultrasonic reflecting member 17 due to the strain in the elastic portion 16, for example. The curvature is set based on factors such as the velocity of ultrasonic waves propagating through the acoustic lens 15 and elastic portion 16, and the distance from the acoustic lens 15 to the ultrasonic reflecting member 17.

Operational Effects of Fourth Embodiment

In this type of tactile sensor 1C of the fourth embodiment, the acoustic lens 15B has a convex surface 156, and the traveling directions of the ultrasonic waves transmitted from the ultrasonic arrays 12 are refracted by the convex surface 156 so as to be diffused. Therefore, even when there is a large amount of strain in the elastic portion 16 and a large amount of movement by the ultrasonic reflecting member 17, the position, movement amount, and movement direction of the ultrasonic reflecting member 17 can be calculated from the diffused ultrasonic waves.

Fifth Embodiment

Next, the fifth embodiment of the present invention will be described based on the drawings.

Figure 12:
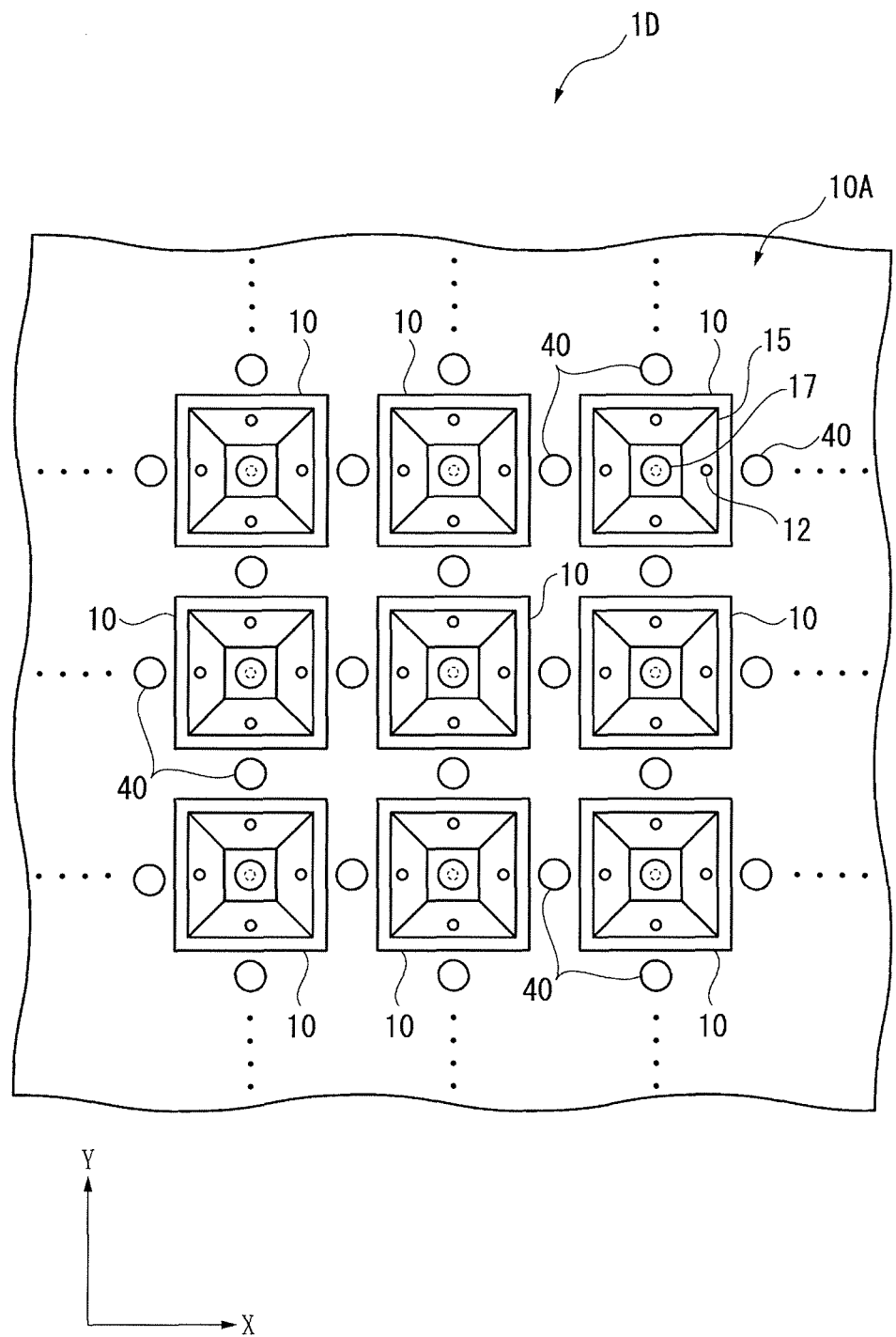
FIG. 12 is a drawing showing the configuration of the sensor array in the tactile sensor of the fifth embodiment.
Figure 13:
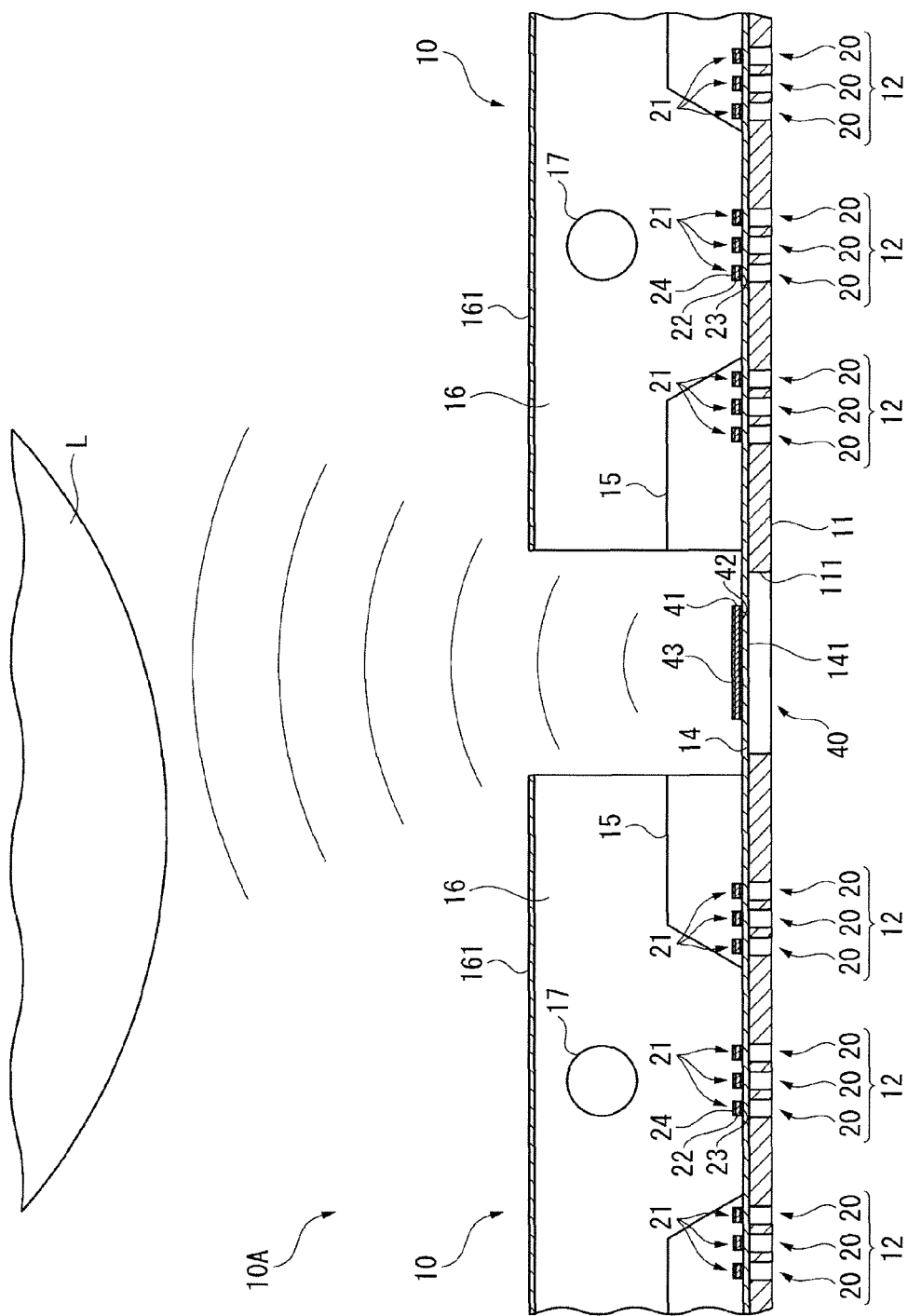
FIG. 13 is a cross-sectional view showing the cross-sectional structures of two sensor bodies adjacent to each other in the sensor array in FIG. 12.

FIG. 12 is a drawing showing the configuration of the sensor array in the tactile sensor of the fifth embodiment. FIG. 13 is a cross-sectional view showing the cross-sectional structures of two sensor bodies 10 adjacent to each other in the sensor array 10A (the ultrasonic sensor) in FIG. 12. Components similar to those of the embodiments described above are denoted by the same symbols and are not described.

The tactile sensor 1D of the fifth embodiment comprises a sensor array 10A having an array structure in which sensor bodies 10 of the first embodiment are disposed uniformly in the X-axis direction and Y-axis direction.

In the sensor array 10A constituting the ultrasonic sensor herein, the substrate 11 and support film 14 of the sensor bodies 10 are shared members, the support film 14 is formed on a single substrate 11, and the sensor bodies 10 laid out in rectangular sections are formed on the support film 14 as shown in FIG. 12.

Proximity-detecting ultrasonic elements 40 are provided between adjacent sensor bodies 10 of the sensor array 10A.

The proximity-detecting ultrasonic elements 40 are configured from openings 111 formed in the substrate 11, the support film 14 (a membrane 141) which closes off the openings 111, film-shaped piezoelectric films 41 disposed in areas inside the membrane 141, and bottom electrodes 42 and top electrodes 43 disposed sandwiching the piezoelectric films 41, as shown in FIG. 13. The elastic portion 16 is not formed on the proximity-detecting ultrasonic elements 40. Therefore, when alternating-current voltage is applied to the proximity-detecting ultrasonic elements 40, ultrasonic waves are transmitted by propagating through the air above the sensor array 10A.

The piezoelectric films 41, the bottom electrodes 42, and the top electrodes 43 herein are configured from the same structural materials as the piezoelectric films 22, the bottom electrodes 23, and the top electrodes 24 constituting the ultrasonic arrays 12. In a sensor plan view, the membrane 141 and the openings 111 of the proximity-detecting ultrasonic elements 40 are formed with greater surface areas than the membrane 141 and the openings 111 of the ultrasonic arrays 12, and the piezoelectric films 41, the bottom electrodes 42, and the top electrodes 43 also have greater surface areas than the piezoelectric films 22, the bottom electrodes 23, and the top electrodes 24. The proximity-detecting ultrasonic elements 40 are thereby capable of outputting ultrasonic waves with greater acoustic pressure than the ultrasonic elements 20 constituting the ultrasonic arrays 12, and the ultrasonic waves can be sent farther distances.

With this type of tactile sensor 1B, when a contact object L comes into proximity directly above the sensor array 10A, the ultrasonic waves transmitted from the proximity-detecting ultrasonic elements 40 are reflected by the contact object L and received by the proximity-detecting ultrasonic elements 40.

FIG. 12 shows an example of a configuration in which the elastic portion 16 is separated at each sensor body 10, but the configuration is not limited to this example, and an elastic portion 16 covering the entire support film 14 may be provided, for example. In this case, it is preferable that openings be provided in the elastic portion 16 only in areas directly above the proximity-detecting ultrasonic elements 40, and that ultrasonic waves for detecting distance be transmitted through these openings.

Figure 14:
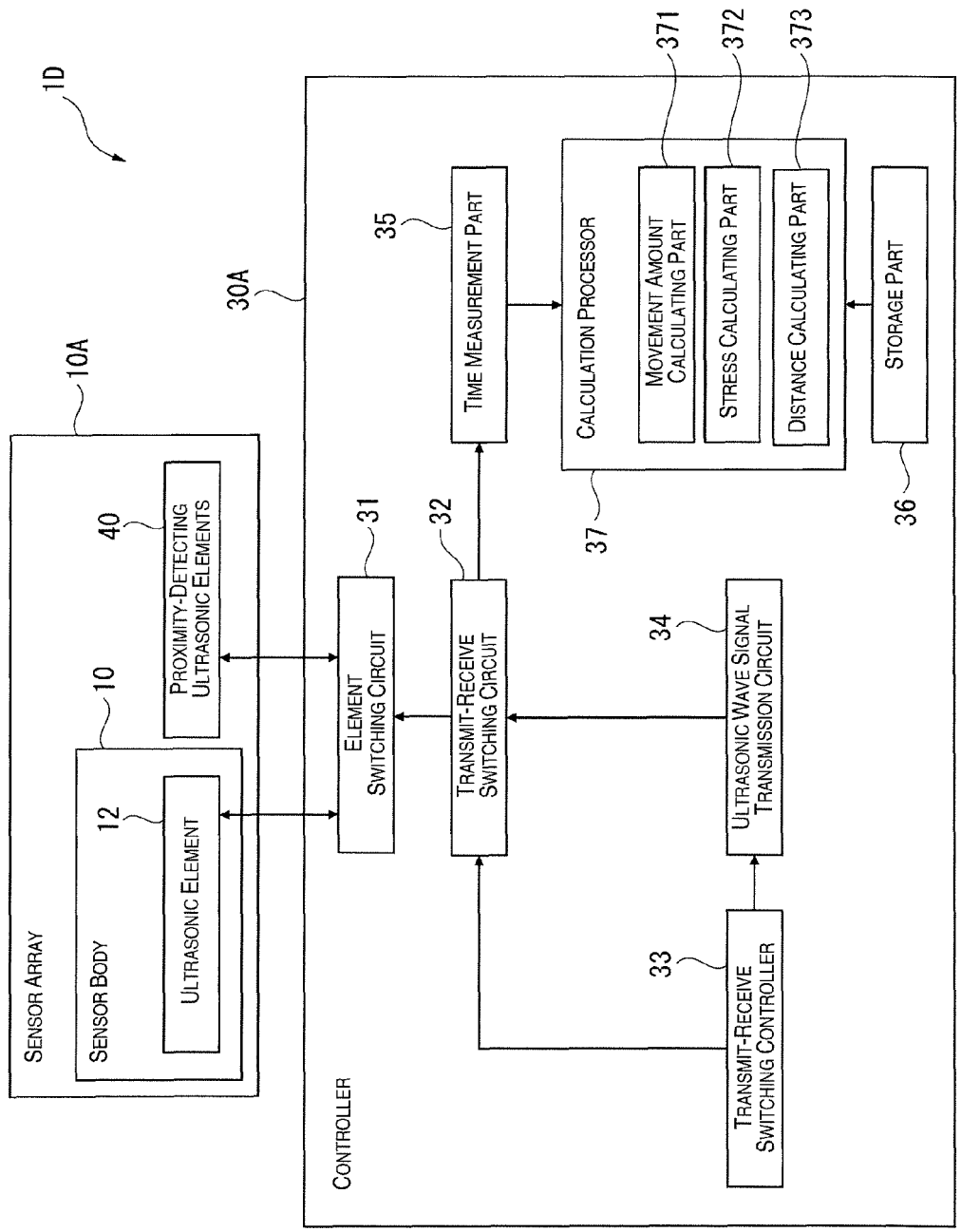
FIG. 14 is a block diagram showing the schematic configuration of a controller in the tactile sensor of the fifth embodiment.

FIG. 14 is a block diagram showing the schematic configuration of a control unit or controller 30A in the tactile sensor 1B.

In the controller 30A, in addition to the components of the first embodiment, the calculation processor 37 also has a distance calculating part 373 as shown in FIG. 14.

When the TOF data is acquired by the time measurement part 35 based on the reception signals outputted from the proximity-detecting ultrasonic elements 40, the distance calculating part 373 calculates the distance between the sensor array 10A and the contact object L based on the TOF data. Specifically, the acoustic velocity in air is stored in advance in the storage part 36 of the controller 30, and based on both the acquired TOF data and the acoustic velocity in air read from the storage part 36, the time measurement part 35 calculates the distance between the sensor array 10A and the contact object L.

The transmit-receive switching controller 33 of the controller 30A sets the tactile sensor 1B to standby mode when the power source of the tactile sensor 1B is turned on. In this standby state, the transmit-receive switching controller 33 stops the ultrasonic arrays 12 and drives only the proximity-detecting ultrasonic elements 40. Specifically, the transmit-receive switching controller 33 periodically switches between ultrasonic wave transmission mode in which ultrasonic waves are transmitted from the proximity-detecting ultrasonic elements 40, and ultrasonic wave reception mode in which reflected ultrasonic waves are received by the proximity-detecting ultrasonic elements 40.

When TOF data based on reception signals outputted from the proximity-detecting ultrasonic elements 40 is acquired in the time measurement part 35, the transmit-receive switching controller 33 observes the distance between the sensor array 10A and the contact object L calculated by the distance calculating part 373. When the transmit-receive switching controller 33 determines that the distance between the sensor array 10A and the contact object L is equal to or less than a preset threshold, a drive mode is set. In this drive mode, switching is periodically performed between ultrasonic wave transmission mode in which ultrasonic waves are transmitted from the ultrasonic arrays 12 and ultrasonic wave reception mode in which reflected ultrasonic waves are received by the ultrasonic arrays 12, similar to the first embodiment described above. The controller 30A thereby performs a process of calculating the stress acting on the elastic portion 16 when the contact object L has come in contact with the elastic portion 16, similar to the first embodiment described above. At this time, the transmit-receive switching controller 33 controls the element switching circuit 31 to stop the driving of the proximity-detecting ultrasonic elements 40.

Upon determining that the stress (the positive pressure force and shearing force) calculated by the stress calculating part 372 has reached "0," the transmit-receive switching controller 33 reinstates standby mode, stops the ultrasonic arrays 12, and drives the proximity-detecting ultrasonic elements 40.

Operational Effects of Fifth Embodiment

With the tactile sensor 1D of the fifth embodiment, the following effects can be achieved in addition to the operational effects of the first embodiment described above. Specifically, the tactile sensor 1B comprises a sensor array 10A in which a plurality of sensor bodies 10 are arranged in an array. Therefore, positive pressure force and shearing force can be detected over a wide range by the plurality of sensor bodies 10.

The proximity-detecting ultrasonic elements 40 are also provided between adjacent sensor bodies 10. Therefore, it is possible to distinguish whether or not there is a contact object L in proximity to the tactile sensor 1B by determining whether or not ultrasonic waves transmitted from the proximity-detecting ultrasonic elements 40 have been reflected and returned by the contact object L.

Furthermore, since the distance calculating part 373 is provided to the controller 30A, the TOF data measured based on reception data outputted from the proximity-detecting ultrasonic elements 40 can be used to calculate the distance from the sensor array 10A to the contact object L.

Furthermore, when the distance to the contact object L as calculated by the distance calculating part 373 is equal to or greater than a preset threshold, the transmit-receive switching controller 33 stops the driving of the ultrasonic arrays 12, and when the distance to the contact object L is less than the preset threshold, the transmit-receive switching controller 33 drives the ultrasonic arrays 12. By switching the driving of the ultrasonic arrays 12 in this manner, power can be consumed.

Sixth Embodiment

Next, a grasping apparatus comprising the tactile sensor 1D is described based on the drawings as an applied example of an apparatus that uses the tactile sensor 1, 1A, 1B, 1C, 1D described above.

Figure 15:
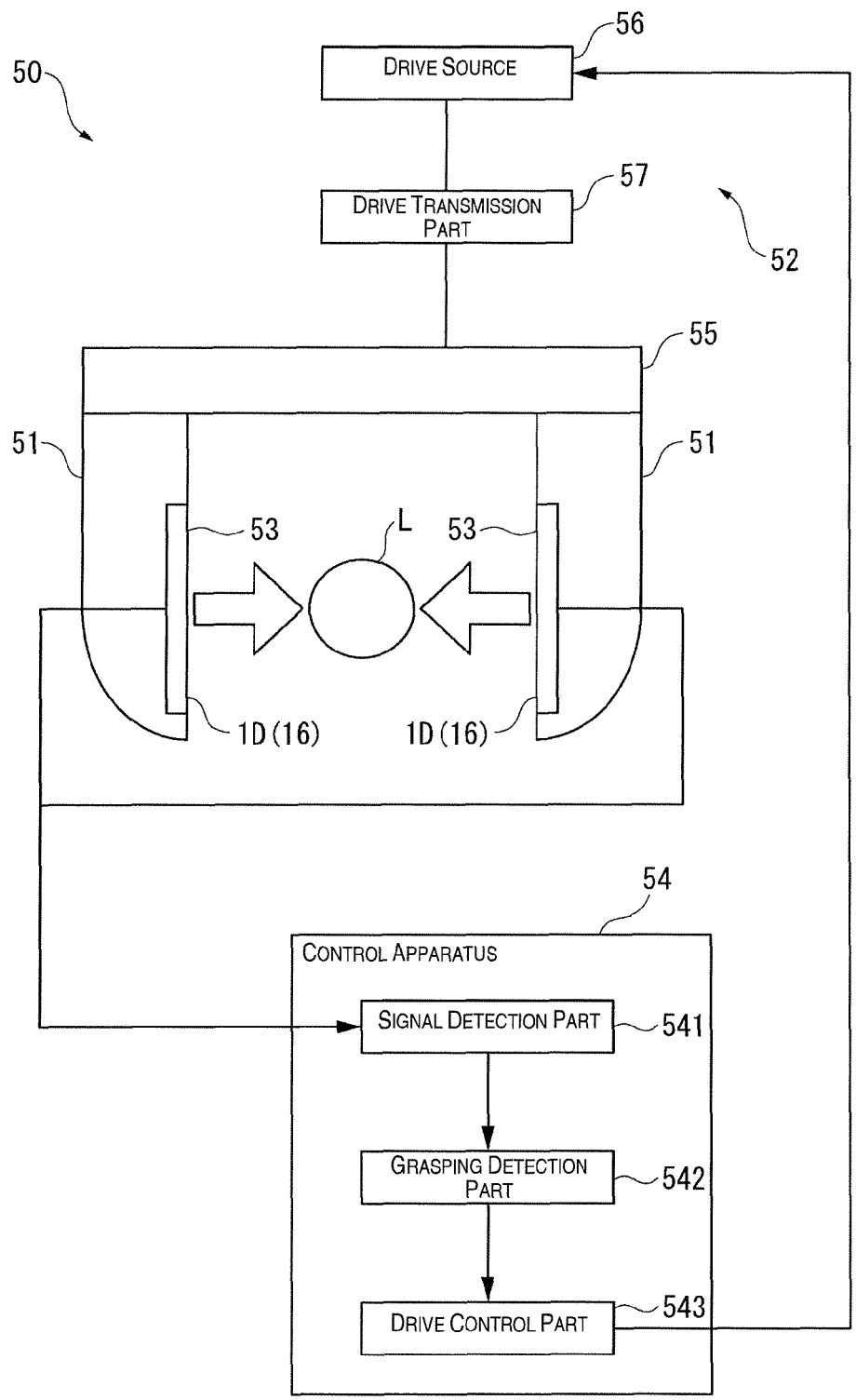
FIG. 15 is an apparatus block diagram showing the schematic configuration of a grasping apparatus of the sixth embodiment.

FIG. 15 is an apparatus block diagram showing the schematic configuration of a grasping apparatus of the sixth embodiment according to the present invention.

In FIG. 15, a grasping apparatus 50, which comprises at least a pair of grasping arms 51, is an apparatus for grasping a grasped object Z by these grasping arms 51. The grasping apparatus 50 is an apparatus which grasps and lifts up an object conveyed by a belt conveyor or the like in a manufacturing plant or the like where products are manufactured, for example. The grasping apparatus 50 is configured comprising the grasping arms 51, an arm drive part 52 for driving the grasping arms 51, and a control apparatus 54 for controlling the driving of the arm drive part 52.

The pair of grasping arms 51 comprises grasping surfaces 53 which are contact surfaces in their distal ends, and the grasping surfaces 53 are brought in contact with the grasped object Z to grasp and thereby lift up the object Z. In the present embodiment, an example of a configuration is presented in which a pair of grasping arms 51 is provided, but the configuration is not limited to this example, and another option is a configuration in which the object Z is grasped at three points of support by three grasping arms 51, for example.

A tactile sensor 1D described in the third embodiment is provided to each surface of the grasping surfaces 53 provided to the grasping arms 51, and elastic portions 16 on the surface parts of the tactile sensors 1D are exposed. The grasping arms 51 grasp the object Z by bringing the elastic portions 16 in contact with the object Z and applying a predetermined amount of pressure (positive pressure force) to the object Z. With such grasping arms 51, the tactile sensors 1D provided to the grasping surfaces 53 detect both the positive pressure force applied to the object Z and the shearing force that acts as though to cause the object Z to slip off the grasping surfaces 53 when the object is grasped, and electric signals corresponding to the positive pressure force and shearing force are outputted to the control apparatus 54.

The arm drive part 52 is an apparatus for moving the pair of grasping arms 51 toward and away from each other. The arm drive part 52 comprises a holding member 55 for moveably holding the grasping arms 51, a drive source 56 for generating drive force for moving the grasping arms 51, and a drive transmission part 58 for transmitting the drive force of the drive source to the grasping arms 51.

The holding member 55 comprises guiding grooves, for example, running along the movement direction of the grasping arms 51, and the grasping arms 51 are held in these guiding grooves, whereby the grasping arms 51 are held in a moveable manner. The holding member 55 is also provided to be capable of moving in a vertical direction.

The drive source 56, which is a drive motor, for example, generates drive force in accordance with a drive control signal inputted from the control apparatus 54.

The drive transmission part 58 is configured from a plurality of gears, for example, the drive force generated by the drive source 56 is transmitted to the grasping arms 51 and the holding member 55, and the grasping arms 51 and the holding member 55 are moved.

In the present embodiment, the above-described configuration is presented as one example, but the present invention is not limited to this configuration. Specifically, the present invention is not limited to a configuration in which the grasping arms 51 are moved along the guiding grooves of the holding member 55, and the configuration may be such that the grasping arms are held so as to be capable of turning. The drive source 56 is not limited to a drive motor and may be configured to as to drive by a hydraulic pump or the like, for example. The drive transmission part 58 is not limited to a configuration wherein drive force is transmitted by toothed gears, for example, and the drive transmission part 58 may have a configuration wherein drive force is transmitted by a belt or chain, a configuration comprising pistons driven by oil pressure or the like, or another such configuration.

The control apparatus 54 is connected to both the arm drive part 52 and the tactile sensors 1B provided to the grasping surfaces 53 of the grasping arms 51, and the control apparatus 54 controls the entire action of grasping the object Z in the grasping apparatus 50.

Specifically, the control apparatus 54 is connected to the arm drive part 52 and the tactile sensors 1B as shown in FIG. 15, and the control apparatus 54 controls the entire action of the grasping apparatus 50. This control apparatus 54 comprises signal detection part 541 for reading shearing force detection signals and positive pressure force detection signals inputted from the tactile sensors 1B, grasping detection part 542 for detecting the manner in which the object Z is slipping, and drive control part 543 for outputting drive control signals for controlling the driving of the grasping arms 51 to the arm drive part 52. A personal computer or another all-purpose computer, for example, can be used as the control apparatus 54, which may be configured comprising a keyboard or another input device, a display part for displaying the grasped state of the object Z, and other components, for example.

The signal detection part 541, the grasping detection part 542, and the drive control part 543 may be stored as programs in a memory or another storage part, for example; they may be appropriately read and executed by a CPU or another computing circuit; they may be configured from ICs or other integrated circuits, for example; and they may perform predetermined processes in response to inputted electric signals.

The signal detection part 541, which is connected to the tactile sensors 1B, acquires positive pressure force detection signals, shearing force detection signals, and the like inputted from the tactile sensors 1D. The detection signals perceived by the signal detection part 541 are outputted to and stored in a memory or another storage part (not shown), for example, and are outputted to the grasping detection part 542.

Based on the shearing force detection signals, the grasping detection part 542 determines whether or not the object Z has been grasped by the grasping arms 51.

Figure 16:
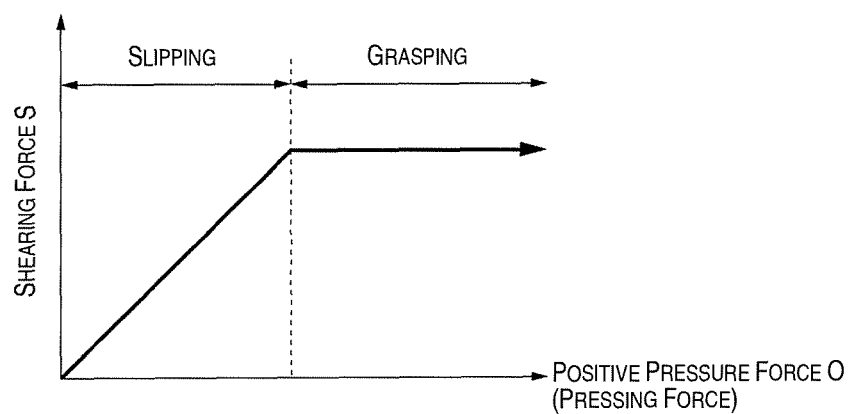
FIG. 16 shows a graph showing the relationship between the positive pressure force and shearing force acting on the tactile sensor during the grasping action of the grasping apparatus of the sixth embodiment.

FIG. 16 shows a graph showing the relationship between positive pressure force and shearing force acting on the tactile sensor during the grasping action of the grasping apparatus 50.

In FIG. 16, the shearing force increases according to the increase in positive pressure force until the positive pressure force reaches a predetermined value. This is a state in which kinetic friction force is acting between the object Z and the grasping surfaces 53, and the grasping detection part 542 determines that grasping is incomplete in this slippage state in which the object Z is slipping off from the grasping surfaces 53. When the positive pressure force reaches a predetermined value or greater, the shearing force will not increase even if the positive pressure force is increased. This is a state in which static friction force is acting between the object Z and the grasping surfaces 53, and the grasping detection part 542 determines it to be a grasping state in which the object Z is grasped by the grasping surfaces 53.

Specifically, when the value of the shearing force detection signal exceeds a predetermined threshold corresponding to the static friction force, grasping is determined to be complete.

The drive control part 543 controls the action of the arm drive part 52 based on electric signals detected by the grasping detection part 542.

Next, the action of the control apparatus 54 will be described based on the drawings.

Figure 17:
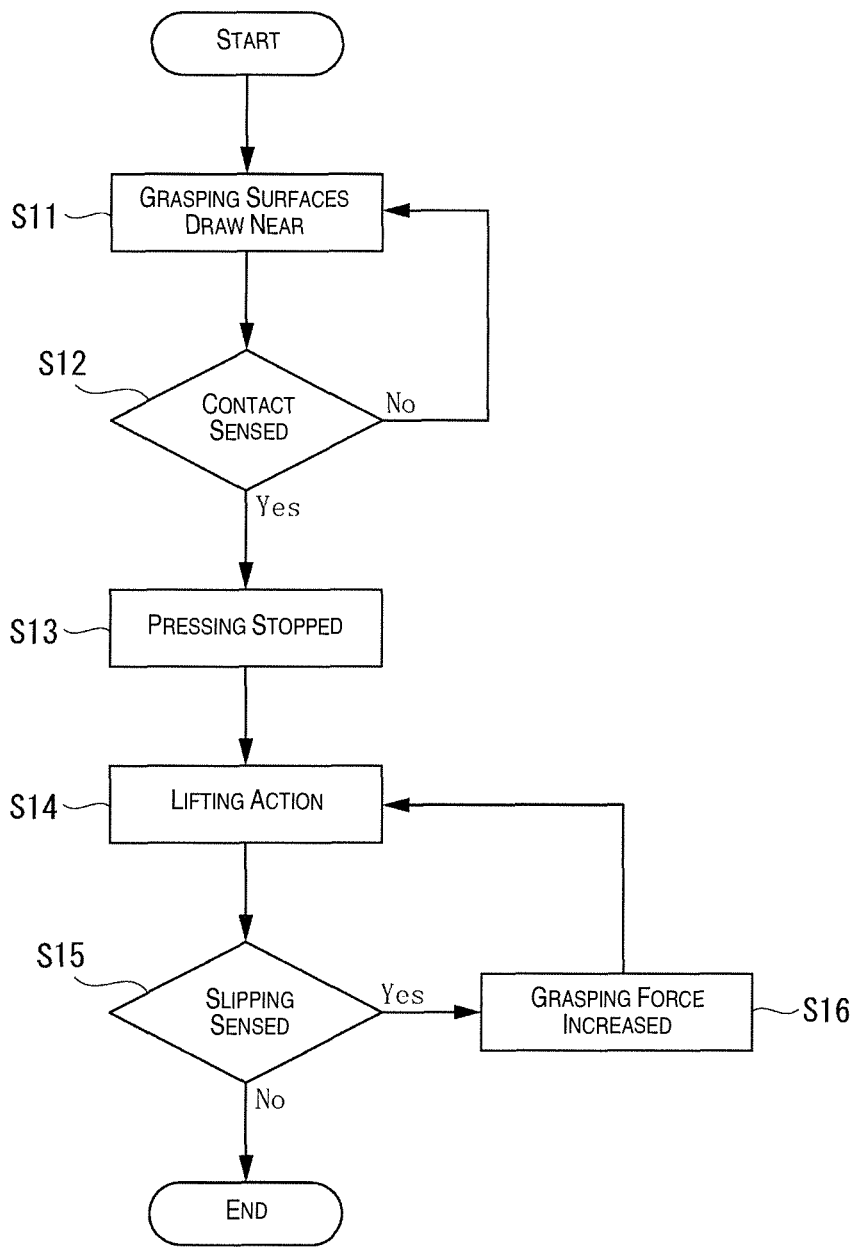
FIG. 17 is a flowchart showing the grasping action of the grasping apparatus due to control of the control apparatus of the sixth embodiment.
Figure 18:
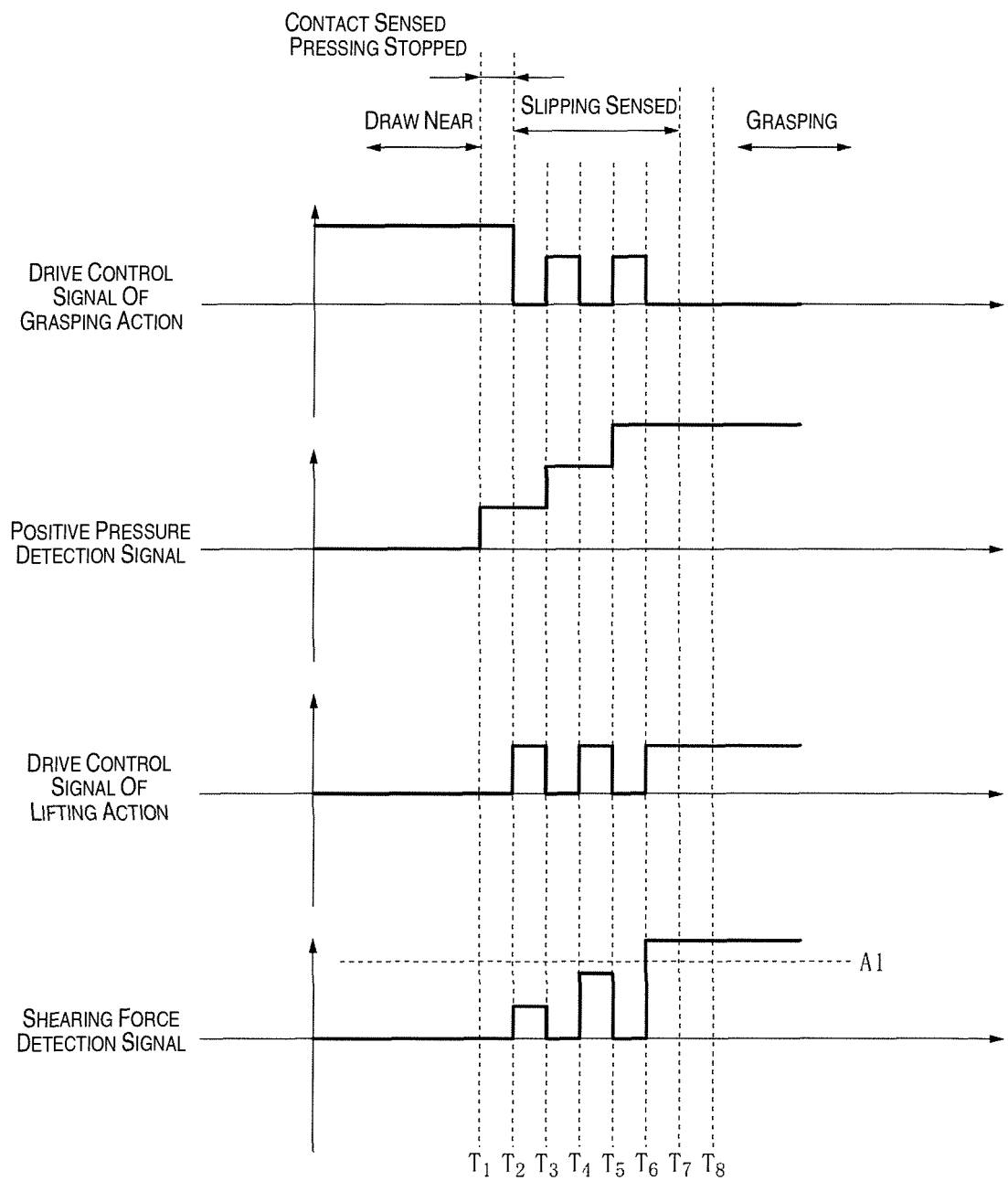
FIG. 18 is a timing chart showing the transmission timing of drive control signals sent to the arm drive part and detection signals outputted from the tactile sensor during the grasping action of the grasping apparatus of the sixth embodiment.

FIG. 17 is a flowchart showing the grasping action of the grasping apparatus 50 due to control of the control apparatus 54. FIG. 18 is a timing chart showing the transmission timing of drive control signals sent to the arm drive part 52 and detection signals outputted from the tactile sensor 1B during the grasping action of the grasping apparatus 50.

To grasp the object Z with the grasping apparatus 50, the drive control part 543 of the control apparatus 54 first outputs to the arm drive part 52 a drive control signal indicating that the grasping arms 51 are to be moved toward each other (the grasping action). The grasping surfaces 53 of the grasping arms 51 thereby draw near the object Z (FIG. 17: step S11).

Next, the grasping detection part 542 of the control apparatus 54 determines whether or not the object Z is in contact with the grasping surfaces 53 (FIG. 17: step S12). Specifically, the control apparatus 54 determines whether or not the input of a positive pressure force detection signal has been sensed by the signal detection part 541. When a positive pressure force detection signal is not detected, it is determined that the grasping surfaces 53 are not in contact with the object Z, and the drive control part 543 continues step S11, outputs a drive control signal, and further drives the grasping arms 51.

When the grasping surfaces 53 come in contact with the object Z (FIG. 18: timing T1), the elastic portions 16 of the tactile sensors 1B undergo strain, and a positive pressure force detection signal is outputted which corresponds to the positive pressure force calculated based on the amount of strain.

When a positive pressure force detection signal is detected in the grasping detection part 542, the drive control part 543 stops the nearing movement of the grasping arms 51 (the pressing on the object Z) (FIG. 17: step S13, FIG. 18: timing T2). The drive control part 543 outputs a drive control signal to the arm drive part 52, and performs an action of lifting up the grasping arms 51 (a lifting action) (FIG. 17: step S14, FIG. 18: timing T2 to T3).

When the object Z is lifted, the elastic portions 16 undergo strain in a shearing direction due to the shearing force, and the tactile sensors 1D calculate the shearing force corresponding to this amount of strain and output a shearing force detection signal corresponding to this shearing force.

Based on the shearing force detection signal inputted to the signal detection part 541, the grasping detection part 542 determines whether or not slipping is occurring (step S15).

At this time, if slipping is determined in the grasping detection part 542, the drive control part 543 controls the arm drive part 52 to move the grasping arms 51 in directions of pressing the grasping surfaces 53 against the object Z and to increase the grasping force (the positive pressure force) (FIG. 18: step S16).

Specifically, at timing T3 in FIG. 18, the control apparatus 54 performs a grasping action with the drive control part 543 and increases the positive pressure force on the object Z, and a shearing force detection signal outputted from the tactile sensors 1B is detected by the signal detection part 541. The slipping-sensing action (timings T2 to T6) described above is repeated and when the shearing force detection signal is equal to or greater than a predetermined threshold A1 (timing T6), it is determined in step S5 that there is no slipping, i.e. that grasping is complete, and the slipping-sensing action is stopped.

Operational Effects of Sixth Embodiment

The grasping apparatus 50 of the sixth embodiment described above comprises the tactile sensor 1D of the fifth embodiment. Since this type of tactile sensor 1D is capable of easily and precisely detecting the shearing force and positive pressure force at any desired position as described above, an accurate grasping action can be performed based on highly precise shearing force detection signals and positive pressure force detection signals in the grasping apparatus 50 as well.

With such a tactile sensor 1D, shearing force can be detection in both the X direction and the Y direction. Therefore, in the sixth embodiment, the shearing force is measured when the object Z is lifted up, but the shearing force can also be measured in the conveying direction when grasping is performed on an object conveyed on a belt conveyor, for example.

Seventh Embodiment

In the fourth embodiment, an example of a grasping apparatus provided with the tactile sensor 1D was presented, but the present invention is not limited to this example.

In the seventh embodiment, an iron comprising the tactile sensor 1D is described based on the drawings as another applied example of an apparatus that uses the tactile sensor 1, 1A, 1B, 1C, 1D.

Figure 19:
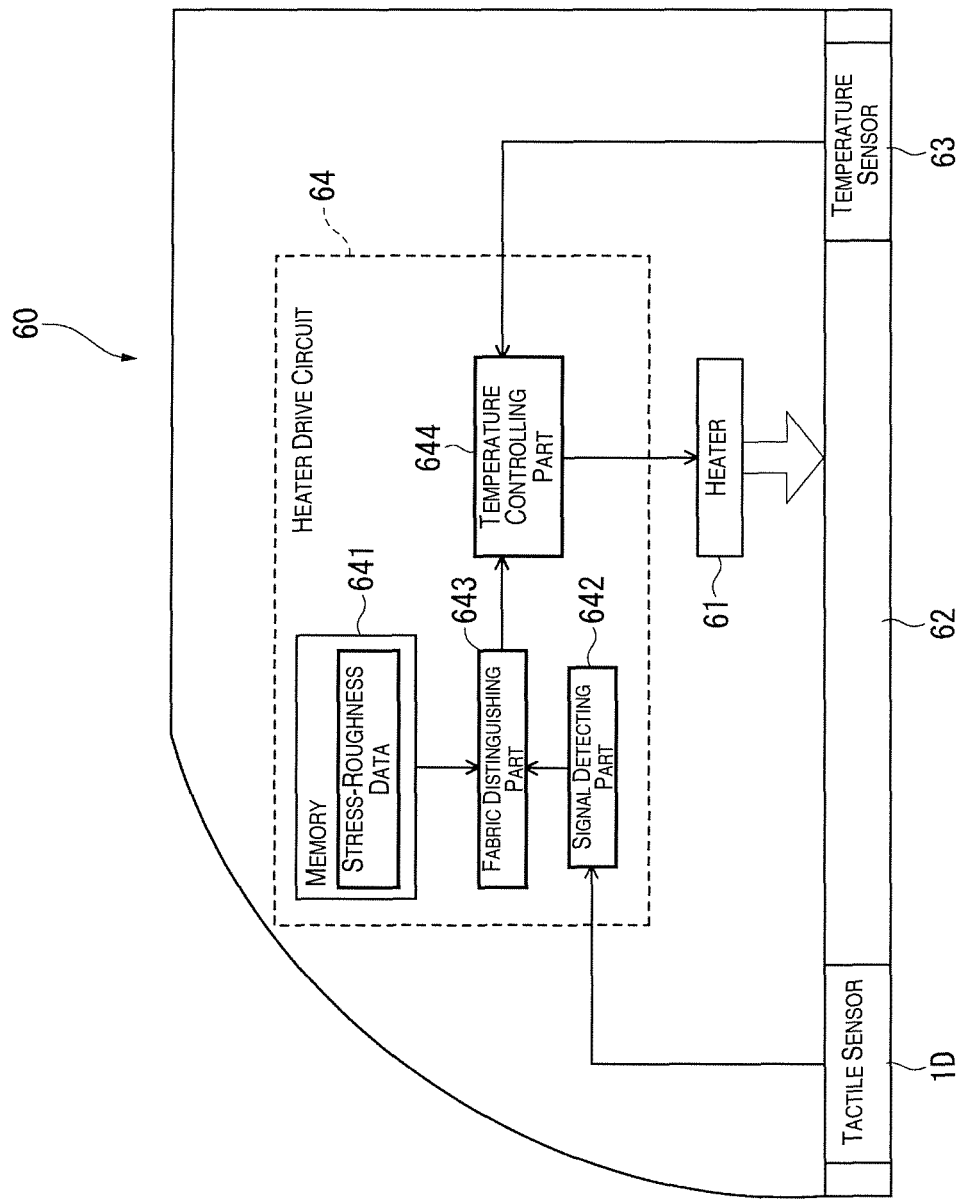
FIG. 19 is a block diagram showing the schematic configuration of an iron according to the seventh embodiment.

FIG. 19 is a block diagram showing the schematic configuration of the iron of the seventh embodiment.

The iron 60 comprises a heater 61, a base 62, a temperature sensor 63 provided to the base 62, a tactile sensor 1A provided to the base 62, and a heater drive circuit 64. The heater drive circuit 64 of this iron 60 controls the voltage applied to the heater 61 based on signals from the temperature sensor 63 and the tactile sensor 1A, and heats the base 62 to the optimal temperature for the target fabric.

The heater 61 generates heat by the voltage applied from the heater drive circuit 64 and heats the base 62.

The base 62 is a portion that comes in contact with the target fabric and smoothes out wrinkles in the target fabric, and is heated by the heater 61. The tactile sensor 1A is provided to part of the base 62 as shown in FIG. 19, and an elastic portion 16 of the tactile sensor 1A is exposed so as to be capable of contact with the target fabric.

The temperature sensor 63 is also provided to the base 62, and this temperature sensor 63 detects the temperature of the base 62 and outputs the temperature to the heater drive circuit 64.

The heater drive circuit 64 is connected to the tactile sensor 1A, the temperature sensor 63, and the heater 61, and based on signals from the tactile sensor 1A and temperature sensor 63, the heater drive circuit 64 controls the voltage applied to the heater 61. This heater drive circuit 64 comprises a memory 641 which is the storage part of the present invention, a signal detecting part 642, a fabric distinguishing part 643, and a temperature controlling part 644, as shown in FIG. 19.

This heater drive circuit 64 may be configured as a computer comprising a CPU or another computing circuit and a storage circuit, for example, wherein the fabric distinguishing part 643 and temperature controlling part 644 may function as software run by computing processes by the computing circuit; or the heater drive circuit 64 may be configured from an IC or another integrated circuit, for example, wherein predetermined processes are performed in response to inputted electric signals.

The memory 641 stores stress-roughness value data, which is the correlation data of the present invention. This stress-roughness value data is data in which the roughness of the target fabric is recorded corresponding to the stress detected by the tactile sensor 1A, wherein roughness values corresponding to shearing force are recorded for each positive pressure force, for example.

Roughness-temperature data in which the optimal temperature of the base 62 corresponding to the roughness value may also be stored in the memory 641.

The signal detecting part 642, which is connected to the tactile sensor 1A, acquires positive pressure force detection signals, shearing force detection signals, and the like inputted from the tactile sensor 1A. Detection signals detected by the signal detecting part 642 are outputted to and stored in the memory 641, and are also outputted to the fabric distinguishing part 643.

Based on the shearing force and positive pressure force inputted from the signal detecting part 642 as well as the stress-roughness value data stored in the memory 641, the fabric distinguishing part 643 identifies the type of target fabric.

For example, in the present embodiment, a roughness corresponding to shearing force is stored as stress-roughness value data for every positive pressure force. In this case, the fabric distinguishing part 643 reads the stress-roughness value data corresponding to the positive pressure force from the memory 641 and acquires a roughness value corresponding to shearing force from this stress-roughness value data.

The fabric distinguishing part 643 then outputs the acquired roughness value to the temperature controlling part 644.

Based on the roughness value inputted from the fabric distinguishing part 643 and the temperature of the base 62 detected by the temperature sensor 63, the temperature controlling part 644 controls the voltage applied to the heater 61.

Specifically, the temperature controlling part 644 reads roughness-temperature data from the memory 641 and acquires the optimal temperature of the base 62 corresponding to the roughness value inputted from the fabric distinguishing part 643. From the difference value between the optimal temperature and the detected temperature inputted from the temperature sensor 63, the temperature controlling part 644 calculates the applied voltage value of the heater 61 needed in order to set the base 62 to the optimal temperature, and applies this voltage to the heater 61.

Action of Iron

The following is a description of the action of an iron 60 such as the one described above.

Figure 20:
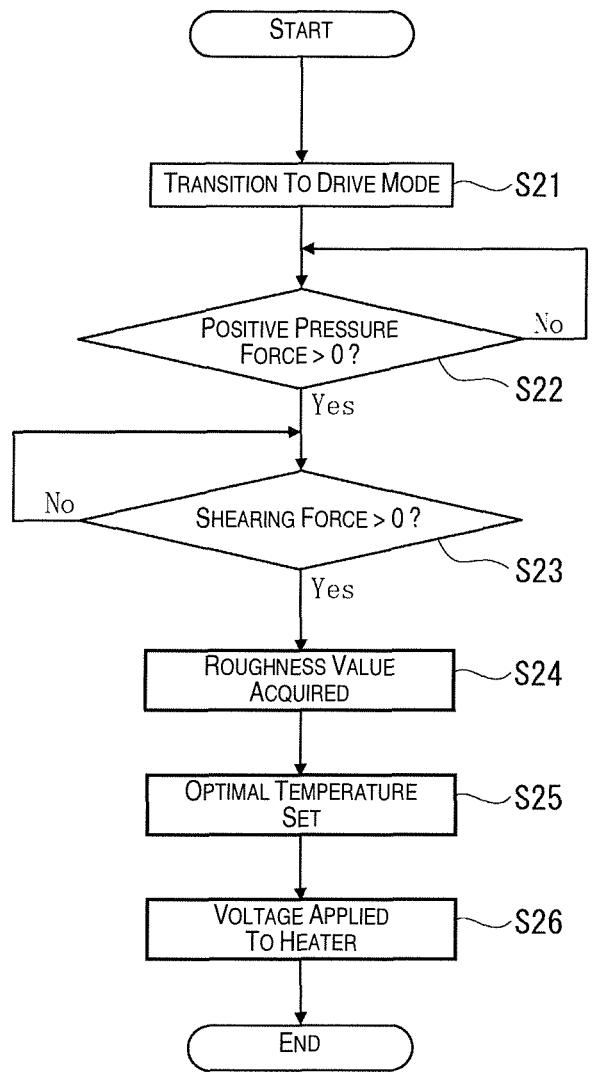
FIG. 20 is a flowchart showing the action of the iron of the seventh embodiment.

FIG. 20 is a flowchart showing the action of the iron of the seventh embodiment.

When electricity is supplied to the iron 60 by a user, the proximity-detecting ultrasonic elements 40 of the tactile sensor 1A are driven. The tactile sensor 1A thereby calculates the distance between the target fabric and the tactile sensor 1A (the base 62) as described above in the third embodiment. When the distance between the target fabric and the base 62 is a preset distance or less, the tactile sensor 1A transitions to drive mode (step S21).

The heater drive circuit 64 of the iron 60 then determines whether or not the target fabric is in contact with the base 62 (step S22). Specifically, the heater drive circuit 64 determines whether or not an input of a positive pressure force detection signal has been sensed by the signal detecting part 642. When a positive pressure force detection signal has not been detected, it is determined that the target fabric is not in contact with the base 62. In this case, the heater drive circuit 64 continues step S22 and continues the process of determining contact between the target fabric and the base 62.

In step S22, when the signal detecting part 642 has sensed the input of a positive pressure force detection signal, it then detects the input of a shearing force detection signal and determines whether or not the extent of the shearing force is greater than 0 (step S23).

In other words, the extent of the positive pressure force varies depending on the strength with which the user presses the iron 60 against the target fabric, and the type of target fabric therefore cannot be distinguished with positive pressure force alone. Therefore, when the extent of the shearing force is 0, the sequence continues and the process f step S23 is performed.

In step S23, when the extent of the shearing force detected from the shearing force detection signal is greater than 0, the fabric distinguishing part 643 reads the stress-roughness value data corresponding to the positive pressure force from the memory 641 and acquires a roughness value corresponding to the shearing force (step S24).

The temperature controlling part 644 then reads the roughness-temperature data from the memory 641, acquires the temperature corresponding to the roughness value acquired in step S24, and sets this temperature as the optimal temperature (step S25).

Furthermore, from the difference value between the detected temperature detected by the temperature sensor 63 and the optimal temperature set in step S25, the temperature controlling part 644 calculates the applied voltage value for the heater 61 needed in order to set the base 62 to the optimal temperature and applies this voltage value to the heater 61 (step S26).

The iron 60 is thereby capable of automatically setting the temperature of the base 62 in accordance with the type of target fabric.

Operational Effects of Seventh Embodiment

The iron 60 of the seventh embodiment described above comprises the tactile sensor 1A of the above-described third embodiment. This type of tactile sensor 1A, as described above, is capable of easily and precisely detecting the shearing force and positive pressure force in any desired position, and the positive pressure force and shearing force when the target fabric is in contact with the base 62 can therefore be detected with high precision in the iron 60 as well.

The heater drive circuit 64 of the iron 60 can, through the fabric distinguishing part 643, distinguish the roughness of the target fabric corresponding to the detected positive pressure force and shearing force. Therefore, the type of target fabric can be determined from the determined target fabric roughness, and the temperature controlling part 644 can set the temperature of the base 62 in accordance with the type of fabric. Therefore, the temperature of the base 62 can be automatically set according to the fabric in the iron 60, and it is possible to omit the troublesome operation of changing the temperature settings in accordance with the type of target fabric.

In the seventh embodiment described above, an example was presented in which the memory 641 stored stress-roughness value data in which roughness values corresponding to positive pressure force and shearing force were recorded, but another possible example of a configuration is one wherein the memory 641 stores stress-fabric type data in which the type of target fabric is recorded corresponding to positive pressure force and shearing force. In this case, the fabric distinguishing part 643 directly identifies the type of target fabric according to positive pressure force and shearing force, and the temperature controlling part 644 acquires the temperature corresponding to the distinguished type of fabric.

Stress-temperature data in which the optimal temperature of the base 62 is stored corresponding to positive pressure force and shearing force may also be stored as correlation data, in which case it is possible to provide an iron 60 in which there is no need to store roughness-temperature data and the temperature of the base 62 can be set automatically with less data.

Furthermore, an example of the iron 60 was presented in which the temperature of the base 62 was set automatically by the heater drive circuit 64, but another optional configuration is one in which it is possible to appropriately switch between an automatic mode in which the temperature of the base 62 is set automatically and a manual mode in which the temperature is set manually, for example.

Other Embodiments

The present invention is not limited to the embodiments previously described, and the present invention includes modifications, improvements, and the like within a range in which the objects of the present invention can be achieved.

For example, in the second embodiment described above, an example of a tactile sensor 1A was presented in which an ultrasonic reflecting member 17 in the shape of a regular polyhedron was provided, but the tactile sensor is not limited to this example, and may be provided with an ultrasonic reflecting member formed into another polyhedron. For example, the ultrasonic reflecting member 17 may be formed into the shape of a quadrangular pyramid or a truncated cone. In the case of a quadrangular pyramid shape, the four surfaces forming the periphery are set to angles orthogonal to the incident direction of ultrasonic waves transmitted from the ultrasonic arrays 12A to 12D, whereby the optimal reflected ultrasonic waves can be returned to the ultrasonic arrays 12. Similarly, if the ultrasonic reflecting member has a truncated cone shape, the inclination angle of the cone's peripheral surface may be set to an angle that is orthogonal to the incident direction of ultrasonic waves transmitted from the ultrasonic arrays 12A to 12D. However, as described above, when the ultrasonic reflecting member has rotated due to strain in the elastic portion 16, there are cases in which the ultrasonic reflecting member does not properly reflect back to the transmission source ultrasonic array 12, and the reception signal is smaller. In this case, the circuit configuration in the controller 30 becomes complex, but examples of options include providing a delay circuit for delaying the timing with which drive voltage is applied to the ultrasonic elements 20 constituting the ultrasonic arrays 12, changing the transmitted directions of ultrasonic waves transmitted from the ultrasonic arrays 12, and the like.

In cases in which the direction of shearing force to be detected has been established in advance and this direction is only one direction, an optional configuration is to dispose only two ultrasonic arrays 12 in the shearing force detecting direction.

Furthermore, in cases in which the direction of the shearing force being detected has been established in advance and this direction includes three or more directions, an optional configuration is to provide a pair of ultrasonic arrays 12 for each of these directions.

Furthermore, an example of an ultrasonic array 12 in which a plurality of ultrasonic elements 20 were disposed in an array was presented as the ultrasonic transducer of the present invention, but the present invention is not limited to this example.

For example, in a sensor plan view, e.g. a plan view, an optional configuration is that the ultrasonic transducer be formed by a single ultrasonic element having a surface area and shape equivalent to the diameter of the ultrasonic wave beam transmitted from the ultrasonic array 12. In this case, the ultrasonic element may be configured with a film-shaped piezoelectric body provided on the membrane 141 or with a bulk piezoelectric body provided on the membrane 141.

In the embodiments described above, an example of a configuration was presented in which the movement amount of the ultrasonic reflecting member 17 in the Z direction was calculated by the fifth ultrasonic array 12E, but the configuration is not limited to this example. Specifically, as described above, since the movement amount in the Z direction can be calculated by the first ultrasonic array 12A and the second ultrasonic array 12B alone, for example, the configuration need not be provided with the fifth ultrasonic array 12E.

The fifth embodiment had a configuration in which the sensor bodies 10 disposed in the sensor array 10A were members shared by the substrate 11 and the support film 14, but the configuration may also have a substrate 11 and a support film 14 provided for each sensor body 10, for example. In this case, the sensor is preferably configured by preparing a separate sensor-mounting substrate and disposing the sensor bodies 10 in an array on this sensor-mounting substrate, for example.

Furthermore, in the sixth embodiment, an example of a configuration for the grasping apparatus 50 was presented in which a pair of grasping arms 51 was provided, but another option is a configuration in which three or more grasping arms move towards and away from each other to grasp the object Z. Another optional configuration is one comprising a drive arm driven by an arm drive part and a stationary arm or stationary wall that is not driven, wherein the drive arm moves toward the stationary arm (the stationary wall) to grasp the object.

Furthermore, in the sixth embodiment, an example was presented in which the tactile sensor 1D was applied to the grasping apparatus 50 for grasping the object Z, and in the seventh embodiment, an example of an iron 60 comprising the tactile sensor 1A was presented, but the present invention is not limited to these examples. For example, the tactile sensor 1, 1A, 1B, 1C, 1D may be applied as input devices or the like, for example. In cases in which they are applied as input devices, they can be incorporated into notebook computers and personal computers, for example. Specifically, another possible example of a configuration is one in which the tactile sensor 1, 1A, 1B, 1C, 1D is provided to a surface portion provided to a plate-shaped input device main body. With such an input device, when the user moves their finger, a touch pen, or the like over the surface portion, shearing force and positive pressure force is generated by these movements. This shearing force and positive pressure force is detected by the tactile sensor 1, 1A, 1B, 1C, 1D, whereby the contact position coordinates and movement direction of the user's finger or touch pen can be detected and outputted as electric signals.

A fabric distinguishing part 643 which identifies the type (the roughness value) of fabric based on the stress-roughness data stored in the memory 641 was presented as an example of a contact object identifier, but this part is not limited as such. For example, the tactile sensor 1, 1A may be provided to a bread-making device, and the contact object identifier may be provided for determining the softness (kneaded state) of the bread dough. In this case, the contact object identifier stores in memory the relationship data between the stress applied to the bread dough and the optimal elastic force for this stress. The contact object identifier determines that the kneaded state is optimal if the positive pressure force and shearing force detected by the tactile sensor 1, 1A are equal to or less than predetermined thresholds centered around the optimal elastic force. With a bread-making device of such a configuration, the kneaded state of the bread dough can be maintained at a certain state, and bread dough of stable product quality can be manufactured.

An example of the above-described ultrasonic elements 20 was presented in which the piezoelectric bodies 21 comprised film-shaped piezoelectric films 22, bottom electrodes 23, and top electrodes 24, but the present invention is not limited to these film shapes, and bulk piezoelectric bodies and electrodes may be used, for example.

The preferred configuration for carrying out the present invention was described in detail above, the present invention is not limited to this configuration. Specifically, the present invention is primarily illustrated and described particularly in relation to specified embodiments, but those skilled in the art can make various modifications and improvements to the embodiments described above without deviating from the scope of the technological ideals and objects of the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An ultrasonic sensor comprising:
   a substrate;
   an ultrasonic transducer disposed on the substrate, and configured to transmit ultrasonic waves that propagate as plane waves in a direction orthogonal to a surface of the substrate;
   an acoustic refracting part contacting the ultrasonic transducer, and configured to refract the ultrasonic waves transmitted from the ultrasonic transducer;
   an elastically deformable elastic portion disposed over the ultrasonic transducer and the acoustic refracting part; and
   an ultrasonic reflecting member disposed within the elastic portion, and configured to reflect the ultrasonic waves,
   the acoustic refracting part being configured to refract, toward the ultrasonic reflecting member, the ultrasonic waves transmitted from the ultrasonic transducer.

2. The ultrasonic sensor according to claim 1, wherein the ultrasonic reflecting member is spherical.

3. A tactile sensor comprising:
   the ultrasonic sensor according to claim 2; and
   a control unit configured to control transmission and reception of ultrasonic waves of the ultrasonic transducer of the ultrasonic sensor.

4. A grasping apparatus for grasping an object comprising:
   a pair of grasping arms configured and arranged to grasp the object and each having a contact surface that comes in contact with the object;
   the tactile sensor according to claim 3 disposed in each of the contact surfaces of the grasping arms;
   a grasping detection part configured to detect a state of slippage of the object based on a signal outputted from the tactile sensor; and
   a drive control part configured and arranged to control driving of the grasping arms based on the slippage state.

5. An electronic device comprising the tactile sensor according to claim 3.

6. The ultrasonic sensor according to claim 1, wherein the ultrasonic reflecting member is a polyhedron having a plurality of reflective surfaces.

7. A tactile sensor comprising:
   the ultrasonic sensor according to claim 6; and
   a control unit configured to control transmission and reception of ultrasonic waves of the ultrasonic transducer of the ultrasonic sensor.

8. A grasping apparatus for grasping an object comprising:
   a pair of grasping arms configured and arranged to grasp the object and each having a contact surface that comes in contact with the object;
   the tactile sensor according to claim 7 disposed in each of the contact surfaces of the grasping arms;
   a grasping detection part configured to detect a state of slippage of the object based on a signal outputted from the tactile sensor; and
   a drive control part configured and arranged to control driving of the grasping arms based on the slippage state.

9. The ultrasonic sensor according to claim 1, wherein the acoustic refracting part has an inclined flat surface that is inclined in relation to a surface of the substrate, along a path traveled by the ultrasonic waves transmitted from the ultrasonic transducer, and
   the inclined flat surface is formed at an inclination angle which satisfies a relationship $(\sin \theta_1)/C_1 = (\sin \theta_2)/C_2$, where $\theta_1$ is an angle formed by a normal direction to the inclined flat surface and a direction in which the ultrasonic waves are transmitted from the ultrasonic transducer, $\theta_2$ is an angle formed by the normal direction to the inclined flat surface and a direction leading from the inclined flat surface to the ultrasonic reflecting member, $C_1$ is an acoustic velocity within the acoustic refracting part, and $C_2$ is an acoustic velocity within the elastic portion.

10. The ultrasonic sensor according to claim 1, wherein the acoustic refracting part has a concave surface along a path traveled by the ultrasonic waves transmitted from the ultrasonic transducer, and
    the concave surface is formed at a curvature whereby the ultrasonic waves are made to converge toward the ultrasonic reflecting member.

11. The ultrasonic sensor according to claim 1, wherein the acoustic refracting part has a convex surface along a path traveled by the ultrasonic waves transmitted from the ultrasonic transducer.

12. The ultrasonic sensor according to claim 1, wherein the ultrasonic transducer includes an ultrasonic array in which a plurality of ultrasonic elements are disposed in an array.

13. The ultrasonic sensor according to claim 1, wherein a plurality of sensor bodies are disposed in an array on the substrate, each of the sensor bodies including the elastic portion, the ultrasonic reflecting member, the ultrasonic transducer, and the acoustic refracting part.

14. The ultrasonic sensor according to claim 13, further comprising
    a proximity-detecting ultrasonic element disposed between adjacent ones of the sensor bodies on the substrate, and configured and arranged to transmit ultrasonic waves through air and receive ultrasonic waves reflected by a contact object.

15. A tactile sensor comprising:
the ultrasonic sensor according to claim 1; and
a control unit configured to control transmission and reception of ultrasonic waves of the ultrasonic transducer of the ultrasonic sensor.

16. The tactile sensor according to claim 15, wherein the control unit has
an ultrasonic wave transmission control part configured to control ultrasonic waves to be transmitted from the ultrasonic transducer,
a time measurement part configured to measure the time from a timing at which ultrasonic waves are transmitted from the ultrasonic transducer until a reception timing at which ultrasonic waves reflected by the ultrasonic reflecting member are received by the ultrasonic transducer, and
a movement amount calculating part configured to calculate an amount and a direction of movement made by the ultrasonic reflecting member, based on the time measured by the time measurement part.

17. The ultrasonic sensor according to claim 16, wherein
the controller has a stress calculating part configured to calculate stress acting on the elastic portion based on the amount and the direction of the ultrasonic reflecting member's movement as calculated by the movement amount calculating part and the Young's modulus of the elastic portion.

18. The tactile sensor according to claim 17, wherein
the ultrasonic sensor has a plurality of sensor bodies disposed in an array on the substrate, each of the sensor bodies including the elastic portion, the ultrasonic reflecting member, the ultrasonic transducer, and the acoustic refracting part, and
the tactile sensor has:
a storage part configured to store correlation data in which a state of a contact object in contact with the elastic portion relative to the stress acting on the elastic portion is recorded, and
a contact object identifying part configured to identify the state of the contact object based on the correlation data and the stress calculated by the stress calculating part.

19. A grasping apparatus for grasping an object comprising:
a pair of grasping arms configured and arranged to grasp the object and each having a contact surface that comes in contact with the object;
the tactile sensor according to claim 10 disposed in each of the contact surfaces of the grasping arms;
a grasping detection part configured to detect a state of slippage of the object based on a signal outputted from the tactile sensor; and
a drive control part configured and arranged to control driving of the grasping arms based on the slippage state.

20. An electronic device comprising the tactile sensor according to claim 15.

21. The ultrasonic sensor according to claim 1, further comprising a contact layer disposed on a surface of the elastic portion, the contact layer being a different member from the elastic portion.

22. The ultrasonic sensor according to claim 1, wherein the contact layer is configured to absorb the ultrasonic waves or diffuse the ultrasonic waves.

23. An ultrasonic sensor comprising:
a substrate;
an ultrasonic transducer disposed over the substrate, and configured to transmit ultrasonic waves that propagate as plane waves in a direction orthogonal to a surface of the substrate;
an acoustic refracting part disposed over the ultrasonic transducer, and configured to refract the ultrasonic waves transmitted from the ultrasonic transducer; and
an elastically deformable elastic portion disposed over the ultrasonic transducer and the acoustic refracting part.

* * * * *